(12) United States Patent
Yamazaki et al.

(10) Patent No.: US 6,781,742 B2
(45) Date of Patent: Aug. 24, 2004

(54) DIGITAL MICROMIRROR DEVICE AND METHOD OF DRIVING DIGITAL MICROMIRROR DEVICE

(75) Inventors: Shunpei Yamazaki, Tokyo (JP); Jun Koyama, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 160 days.

(21) Appl. No.: 09/903,783

(22) Filed: Jul. 11, 2001

(65) Prior Publication Data

US 2002/0051096 A1 May 2, 2002

(30) Foreign Application Priority Data

Jul. 11, 2000 (JP) ........................................ 2000-209738
Jul. 14, 2000 (JP) ........................................ 2000-213829

(51) Int. Cl.[7] ............................................. G02B 26/00
(52) U.S. Cl. ..................................... 359/290; 291/295
(58) Field of Search .............................. 359/290, 291, 359/295, 296; 348/750, 756, 770, 771, 775

(56) References Cited

U.S. PATENT DOCUMENTS

| | | | |
|---|---|---|---|
| 5,142,405 A | 8/1992 | Hornbeck | 359/226 |
| 5,278,652 A | 1/1994 | Urbanus et al. | 348/571 |
| 5,339,116 A | 8/1994 | Urbanus et al. | 348/716 |
| 5,523,803 A | 6/1996 | Urbanus et al. | 348/771 |
| 5,535,047 A | 7/1996 | Hornbeck | 359/295 |
| 5,610,624 A * | 3/1997 | Bhuva | 345/84 |
| 5,745,193 A | 4/1998 | Urbanus et al. | 348/771 |
| 5,990,629 A | 11/1999 | Yamada et al. | 315/169.3 |
| 6,034,660 A * | 3/2000 | Millward et al. | 345/84 |
| 6,188,426 B1 * | 2/2001 | Nakamura | 347/239 |
| 6,246,180 B1 | 6/2001 | Nishigaki | 315/169.3 |
| 6,366,026 B1 | 4/2002 | Saito et al. | 315/169.3 |
| 6,455,392 B2 * | 9/2002 | Maimon et al. | 438/382 |
| 2002/0044140 A1 | 4/2002 | Inukai | 345/204 |

FOREIGN PATENT DOCUMENTS

| | | |
|---|---|---|
| EP | 655723 A1 | 5/1995 |
| EP | 655724 A1 | 5/1995 |
| EP | 1 061 497 A1 | 12/2000 |
| EP | 1 103 946 A2 | 5/2001 |
| JP | 05-150173 | 6/1993 |
| JP | 05-183851 | 7/1993 |
| JP | 07-240891 | 9/1995 |
| JP | 08-051586 | 2/1996 |
| JP | 08-227044 | 9/1996 |
| JP | 08-334709 | 12/1996 |
| JP | 10-312173 | 11/1998 |
| JP | 2000-347621 | 12/2000 |
| JP | 2001-042822 | 2/2001 |

OTHER PUBLICATIONS

U.S. patent application Ser. No. 09/724,387, including specification: 86 pages; 67 claims; abstract; 28 figures of drawings; filed Nov. 28, 2000 (filing receipt attached).

U.S. patent application Ser. No. 09/833,672, including specification: 90 pages; 38 claims; abstract; 29 figures of drawings; filed Apr. 13, 2001 (filing receipt attached).

* cited by examiner

Primary Examiner—Jordan M. Schwartz
Assistant Examiner—Jessica Stultz
(74) Attorney, Agent, or Firm—Fish & Richardson P.C.

(57) ABSTRACT

A spatial light modulation device capable of displaying a large number of gray scales is provided. The inventors of the present invention proposed a spatial light modulation device having: a first structure in which a switching transistor and an erasure transistor, each having its gate electrode connected to a different scanning line, are formed in each pixel, and whose switching is controlled separately; or a second structure in which two switching transistors, each having its gate electrode connected to a different scanning line, are formed in each pixel, and whose switching is controlled separately.

49 Claims, 23 Drawing Sheets

DIGITAL MICROMIRROR DEVICE AND METHOD OF DRIVING DIGITAL MICROMIRROR DEVICE

BACKGROUND OF THE INVENTION

1. Field of the Invention

The present invention relates to a deformable mirror device (DMD), and more specifically, the present invention relates to a method of driving a DMD.

2. Description of the Related Art

The development of high intensity, high definition flat panel displays (FPDs) has been advancing in recent years. Displays such as liquid crystal displays, EL (electroluminescence) displays, and plasma displays can be given as examples of FPDs.

Furthermore, in addition to the above FPDs, digital micromirror devices (hereafter referred to as DMDs) have been in the spotlight. Techniques related to DMDs have been disclosed by Texas Instruments, Inc., in patent applications such as: Japanese Patent Application Laid-open No. Hei 5-150173, Japanese Patent Application Laid-open No. Hei 5-183851, Japanese Patent Application Laid-open No. Hei 7-240891, Japanese Patent Application Laid-open No. Hei 8-334709, Japanese Patent Application Laid-open No. Hei 8-227044, Japanese Patent Application Laid-open No. Hei 8-051586, and Japanese Patent Application Laid-open No. Hei 8-227044.

A plurality of micromirrors approximately 16 $\mu$m×16 $\mu$m in size are formed having a pitch of 17 m$\mu$ on a CMOS SRAM formed on a silicon substrate, and each of the micromirrors corresponds to a screen pixel, in the DMD. The number of micromirrors reaches 480,000 for SVGA, 786,000 for XGA, and 1,300,000 for SXGA.

The angle of the micromirror changes by an angle $\theta$ with respect to the substrate if a digital signal having image information (digital video signal) is input to the SRAM of the DMD, in accordance with an electric field effect due to voltage from the SRAM. If the angle of the micromirror with respect to the substrate changes by an amount $\theta$ (where $0<\theta<90°$), then light from a light source is separated into two directions when reflected in the micromirror. One of the lights separated into two directions is absorbed by a light absorber, while the other arrives at a screen and forms an image.

Note that the term digital signal denotes a signal having two voltage values in this specification. Of the two voltage values, the higher is indicated by the term HI, while the lower is indicated by the term LO.

Schematic diagrams of a structure of a general DMD pixel are shown in FIGS. 20A and 20B. FIG. 20A is a perspective diagram of a DMD pixel, and FIG. 20B is a cross sectional diagram of the DMD pixel of FIG. 20A. A plurality of pixels are formed on a substrate 901, and each pixel has a first electrode (first address electrode) 902a, a second electrode (second address electrode) 902b, landing sites 903, a micromirror 904, a hinge 905, and hinge support posts 906.

The angle of the micromirror 904 with respect to the substrate 901 is changed by an amount $\theta$ with the hinge 905 acting as a rotational axis. The hinge 905 is fixed on the substrate 901 by the hinge posts 906.

A portion of the micromirror 904 contacts the landing site 903 when the micromirror 904 is inclined to an angle greater than $\theta$ with respect to the substrate with the hinge 905 as an axis of rotation. The landing site 903 is maintained at the same electric potential as that of the mirror 904, or has insulating properties.

The electric potential of a digital video signal input to the pixel is imparted to the first address electrode 902a. Further, the digital video signal is inverted with electric potential of ground as a standard point, and the inverted signal is imparted to the second address electrode 902b as an inverted digital video signal.

A fixed electric potential (standard electric potential) is imparted to the micromirror 904. The micromirror 904 is then inclined by an angle $\theta$ to the first address electrode 902a side if the electric potential difference between the standard electric potential and that of the digital video signal is greater than the size of the electric potential difference between the standard electric potential and that of the inverted digital video signal. Conversely, if the electric potential difference between the standard electric potential and that of the digital video signal is smaller than the size of the electric potential difference between the standard electric potential and that of the inverted digital video signal, then the micromirror 904 is inclined by an angle $\theta$ to the second address electrode 902b side.

Digital light processing (DLP) with a projector using a DMD having the above structure differs from a projector using liquid crystals, and there is no light loss from a polarizing plate, and the aperture ratio is equal to or greater than 90%; the efficiency of utilizing light is therefore high. Further, this is a reflective type device, differing from general transmission type liquid crystal panels, and therefore the spacing between pixels, namely the spacing between the micromirrors, is small at about 0.8 $\mu$m, and a high definition image can easily be obtained even a projection is enlarged on the screen. In addition, no thermal problem develops like that of liquid crystal panels using thin film transistors because DMDs have superior cooling efficiency, and it is possible to use a high power light source, and therefore making projectors high definition becomes easy.

A drive circuit of a pixel in a conventional DMD is shown next in FIG. 21. Reference numeral 911 denotes a data driver, reference numeral 912 denotes a scanning driver, and reference numeral 914 denotes a pixel portion. The pixel portion 914 has a plurality of pixels 913.

The digital driver 911 inputs a digital video signal into a plurality of data lines 918, and the scanning driver 912 inputs a scanning signal into a plurality of scanning lines 917. Regions having one data line 918 and one scanning line 917 correspond to the pixels 913 for the case of the DMD shown by FIG. 21.

The pixels 913 each have a switching transistor 915, a SRAM 916 having a plurality of transistors. A gate electrode of the switching transistor 915 is connected to the scanning line 917. Further, one of a source region and a drain region of the switching transistor 915 is connected to the data line 918, and the other is connected to an input terminal Vin of the SRAM 916 and to the first address electrode 902a.

Note that the term SRAM denotes a static RAM having no transfer gates throughout this specification. If HI input is imparted to the SRAM, then LO output is obtained, and if LO input is imparted to the SRAM, then HI output is obtained. Conversely, if a HI output is imparted to the SRAM, then a LO input is obtained, and if a LO output is imparted to the SRAM, then a HI input is obtained.

Note that, throughout this specification, the term transistor denotes an electric field effect transistor, which functions as a switching element.

An out put terminal Vout of the SRAM 916 is connected to the second address electrode 902b. Further, Vddh denotes a high voltage side electric power source, and Vss denotes a low voltage side electric power source.

The switching transistor 915 is selected in the DMD shown in FIG. 21 by the scanning signal input to the scanning line 917 from the scanning driver 912. Note that, in this specification, the term selection of a wiring denotes a state in which all transistors whose gate electrode is connected to the wiring are on.

The digital video signal is then input to the data line 918 from the data driver 911. The input digital video signal is input to the input terminal Vin of the SRAM 916, and to the first address electrode 902a, through the switching transistor 915 in an ON state. The digital video signal input to the input terminal Vin of the SRAM 916 is inverted, with the ground electric potential as a standard, and is then output from the output terminal Vout as an inverted digital video signal, and input to the second address electrode 902b.

If the digital video signal and the inverted digital video signal are input to the first address electrode 902a and to the second address electrode 902b, respectively, then the angle of the micromirror 904 of the pixel with respect to the substrate is selected in accordance with the 1" or 0" information of the digital video signal. Whether light from a light source is irradiated to a screen, or is irradiated to a light absorber, is selected when the angle with respect to the substrate is selected.

The digital video signal is then input in order to all of the pixels 913 of the pixel portion 914, and the micromirror angles are selected. Note that, in this specification, the term digital video signal input to the pixels 913 refers to the digital video signal being input to the source region or the drain region of the switching transistors 915 of the pixels 913.

If the digital video signal is then once again input to the same pixels, the micromirror angles are selected again.

Time division gray scale display of a conventional DMD is explained next using FIG. 22. The horizontal axis shows a time scale, and the vertical axis shows the position of a scanning line in FIG. 22.

A plurality of subframe periods are formed in one frame period with the time division gray scale display used by conventional DMDs.

An example in which n subframe periods are formed within one frame period is shown in FIG. 22. By then selecting the angle of the micromirror in each of the n subframe periods in accordance with the digital video signal, light from the light source is irradiated to the screen or to the light absorber. Hereafter, light irradiated to the screen is referred to as white display, and light irradiated to the light absorber is referred to as black display.

White display or black display is selected from the first subframe to the number n subframe in accordance with the first bit to the number n bit of the digital video signal.

By selecting white display or black display in the n subframe periods, the length of the white display periods and the length of the black display periods within one frame period can be controlled. As a result, the gray scale of an image formed by one frame period can be controlled.

However, if the number of gray scales of the image displayed is increased with the conventional DMD time division gray scale display shown in FIG. 22, the length of the subframe periods becomes shorter. A problem therefore develops in that the write in speed of the digital video signal to the pixels cannot be managed. This problem is explained in detail below using FIG. 23.

The horizontal axis of FIG. 23 shows a time scale, and the vertical axis shows the position of a scanning line. Further, reference symbol t1 denotes the length of a period for writing in the number i bit of the digital video signal to the pixel, and reference symbol t2 denotes the length of a subframe period SFi.

For the case of the drive shown in FIG. 23, t1 t2, and the number i bit of the digital video signal is written into all of the pixels before the number i subframe period SFi is complete and the number (i+1) subframe period SF(i+1) begins. Write in of the number i bit of the digital video signal to the pixels and write in of the number (i+1) bit of the digital video signal to the pixels are therefore not performed in parallel within the same pixel portion.

However, if the number of gray scales becomes larger, and the number i subframe period SFi becomes shorter, then t1>t2. In this case, there are times when write in of the number i bit of the digital video signal to the pixels is not complete, even though the number i subframe period SFi is finished. In other words, write in of the number (i+1) bit of the digital video signal to the pixels must be performed in parallel with write in of the number i bit of the digital video signal. With the DMD structure shown by FIG. 21, drive in which t1>t2 is impossible.

SUMMARY OF THE INVENTION

In view of the above problem, an object of the present invention is to provide a DMD having a novel structure in which display of an image at a high number of gray scales is possible.

The inventors of the present invention proposed a first structure in which two switching elements having their gate electrodes connected to differing scanning lines (a switching transistor and an erasure transistor) are formed in each pixel, and in which switching is controlled separately.

A digital video signal is input to a pixel by placing the switching transistor in an ON state, and a state of black display in the pixel is set by placing the erasure transistor in an ON state. Switching of the switching transistor and the erasure transistor is controlled by using separate scanning driver circuits. Input of the digital video signal in order to the pixels can therefore be performed, in the same pixel portion, in parallel with the setting of a black display state in order in the pixels.

A method of driving a DMD of the present invention is explained using FIG. 1. The horizontal axis shows a time scale in FIG. 1, while the vertical axis shows the position of a scanning line. Further, reference symbol t1 denotes the length of a display period Tri in which each line of pixels performs display in accordance with the number i bit of the digital video signal, and reference numeral t2 denotes the length of a period for performing write in of the number i bit of the digital video signal into all of the pixels.

With the method of driving of FIG. 1, the display period Tri begins by placing the switching transistors into an ON state and writing the number i bit of the digital video signal into the pixels.

Next, the pixels become placed in a black display state, in order, after the display period Tri begins and through the time t1 by turning on the erasure transistors, and the display period Tri is complete. Note that, in this specification, the period during which the pixels are placed in a black display state by turning on the erasure transistors is referred to as a non-display period Td. In particular, the non-display period appearing directly after the display period Tri is referred to as Tdi.

Reference symbol t3 denotes the length of the non-display period Tdi in each line of pixels. It is very important that the length t3 of the non-display period be such that the period for performing write in of the number i bit of the digital video signal to the pixels, and the period for performing write in of the number (i+1) bit of the digital video signal to the pixels, do not overlap. That is, it is very important that t3≧t2 −t1.

The switching transistors again become placed in an ON state after passing the time t3 from the start of the non-display period Tdi, and write in of the number (i+1) bit of the digital video signal to the pixels begins. The non-display period Tdi is completed at the same time as the beginning of write in period of the number (i+1) bit of the digital video signal to the pixels, and the display period Tr(i+1) begins.

In accordance with the above driving method, it becomes possible to make the length of the display period Tri shorter than the length of the period for write in of the digital video signal to all of the pixels, even if write-in to the pixels of the number i bit of the digital signal and write-in to the pixels of the number (i+1) bit of the digital signal are not performed in parallel.

In other words, compared to the time division gray scale display of a conventional DMD, it becomes possible to make the length of the display period corresponding to a conventional subframe period shorter with the DMD time division gray scale display of the first structure of the present invention. Consequently, even if the write in speed to the pixels of the digital video signal is the same as the conventional speed, it becomes possible to make the number of image gray scale very large.

Further, the inventors of the present invention proposed a second structure in which two switching elements having their gate electrodes connected to differing scanning lines (a first switching transistor and a second switching transistor) are formed in each pixel, and in which switching is controlled separately. In the second structure, the two switching transistors are referred to as the first switching transistor and the second switching transistor in the second structure, and both are referred to using the generic name switching transistors.

Input of the number i bit of a digital video signal to the pixels can be performed in parallel with input of the number (i+1) bit of the digital video signal to the pixels, in the same pixel portion, by controlling the first switching transistor and the second switching transistor separately.

A method of driving of the present invention is explained using FIG. 2. The horizontal axis shows a time scale in FIG. 2, while the vertical axis shows the position of a scanning line. Further, reference symbol t1 denotes the length of a period for performing write in of the number i bit of the digital video signal into all of the pixels, and reference symbol t2 denotes the length of a display period Tri in which each line of pixels performs display in accordance with the number i bit of the digital video signal. Case in which t1>t2 is shown in FIG. 2.

With the method of driving of FIG. 2, the display period Tri begins by placing the first switching transistors into an ON state and writing the number i bit of the digital video signal into the pixels.

Next, the number (i+1) bit of the digital video signal is written into the pixels, in order, after the display period Tri begins and up through the time t2 by placing the second switching transistors in an ON state. The display period Tri is completed, and the display period Tr(i+1) begins, in order, from the pixels into which the number (i+1) bit of the digital video signal is written.

It becomes possible to perform write-in to the pixels of the number i bit of the digital video signal, and the number (i+1) bit of the digital video signal, in parallel by using the above driving method. It also becomes possible to make the display period Tri shorter than the length of the period for writing in the digital video signal to all of the pixels.

Compared to the time division gray scale display of a conventional DMD, it becomes possible to make the length of the display period corresponding to a conventional subframe period be shorter with the DMD time division gray scale display of the second structure of the present invention. Consequently, even if the write in speed to the pixels of the digital video signal is the same as the conventional speed, it becomes possible to make the number of image gray scale very large.

Now, the structure of the present invention will be described.

According to a first structure of the present invention, there is provided a micromirror device comprising a data driver, a write in scanning driver, an erasure scanning driver, a pixel portion, and a power source for the erasing operation, characterized in that:

the pixel portion has a plurality of pixels;

each one of the plurality of pixels has a first address electrode and a second address electrode;

a digital video signal output from the data driver is input to the first address electrode by the write in scanning driver;

an electric potential of the power source for the erasing operation is applied to the second address electrode by the erasure scanning driver;

the electric potential of the first address electrode and the electric potential of the second address electrode are always inverted with ground taken as a reference point.

The present invention relates to a micromirror device comprising a data driver, a write in scanning driver, an erasure scanning driver, a pixel portion, and a power source for the erasing operation, characterized in that:

the pixel portion has a plurality of pixels;

each one of the plurality of pixels has a switching transistor, an SRAM, a transistor for the erasing operation, a first address electrode and a second address electrode;

the write in scanning driver controls a switching of the switching transistor;

the erasure scanning driver controls a switching of the transistor for the erasing operation;

the data driver inputs a digital video signal to an input terminal of the SRAM and to the first address electrode through the switching transistor;

an output terminal of the SRAM is connected to the second address electrode; and the power source for the erasing operation is connected to the second address electrode and the output terminal through the transistor for the erasing operation.

According to the first structure of the present invention, there is provided a micromirror device comprising a data driver, a write in scanning driver, an erasure scanning driver, a pixel portion, and a power source for the erasing operation, a plurality of scanning lines for the writing operation, and a plurality of scanning lines for the erasing operation, characterized in that:

the pixel portion has a plurality of pixels;

each one of the plurality of pixels has a switching transistor, a SRAM, a transistor for the erasing operation, a first address electrode and a second address electrode;

a switching of the switching transistor is controlled by a scanning signal for the writing operation which is input to the plurality of the scanning lines for the writing operation from the write in scanning driver;

a switching of the transistor for the erasing operation is controlled by a scanning signal for the writing operation which is input to the plurality of the scanning lines for the erasing operation from the erasure scanning driver;

the data driver inputs a digital video signal to an input terminal of the SRAM and to the first address electrode through the switching transistor;

an output terminal of the SRAM is connected to the second address electrode; and the power source for erasing operation is connected to the second address electrode and the output terminal through the transistor for erasing operation.

According to the first structure of the present invention, there is provided a micromirror device comprising a data driver, a write in scanning driver, an erasure scanning driver, a pixel portion, and a power source for the erasing operation, characterized in that:

the pixel portion has a plurality of pixels;

each one of the plurality of pixels has a first address electrode and a second address electrode;

a digital video signal output from the data driver is input to the first address electrode by the write in scanning driver;

an electric potential of the power source for the erasing operation is applied to the second address electrode by the erasure scanning driver;

the electric potential of the first address electrode and the electric potential of the second address electrode are always inverted with ground taken as a reference point;

n display periods Tr1, Tr2 . . . and Trn and j non-display periods Td1, Td2, and Tdj appear within one frame period of each line of pixels of the plurality of pixels;

a display period Tri (i is 1, . . . or any one of n) is a period from when the number i bit of a digital video signal is input to each line of the pixels, until the next digital video signal is input to each line of the pixels, or a period until the electric potential of the power source for the erasing operation is applied to the second address electrodes which are possessed by each line of the pixels, respectively;

a non-display period Tdk (k is 1, . . . or any one of n) is a period from when the electric potential of the power source for the erasing operation is applied to the second address electrodes which are possessed by each line of the pixels, respectively, until the digital video signal is input to each line of the pixels;

after all of the n display periods Tr1, Tr2, . . . , and Trn appeared, any one of the n display periods Tr1, Tr2, . . . , and Trn appears again;

white display or black display is selected, by the digital video signal, in the n display periods Tr1, Tr2, . . . , and Trn; and the ratio of lengths of the n display periods Tr1, Tr2, . . . , and Trn is represent by $2^0::2^1::2^2 \ldots, 2^{(n-1)}$.

According to the first structure of the present invention, there is provided a micromirror device comprising a data driver, a write in scanning driver, an erasure scanning driver, a pixel portion, and a power source for the erasing operation, a plurality of scanning lines for the writing operation, and a plurality of scanning lines for the erasing operation, characterized in that:

the pixel portion has a plurality of pixels;

each one of the plurality of pixels has a switching transistor, a SRAM, a transistor for the erasing operation, a first address electrode and a second address electrode;

the write in scanning driver controls a switching of the switching transistor;

the erasure scan driver controls a switching of the transistor for the erasing operation;

the data driver inputs a digital signal to an input terminal of the SRAM and to the first address electrode through the switching transistor;

an output terminal of the SRAM is connected to the second address electrode;

the power source for the erasing operation is connected to the second address electrode and to the output terminal through the transistor for the erasing operation;

n display periods Tr1, Tr2 . . . and Trn and j non-display periods Td1, Td2, and Tdj appear within one frame period of each line of pixels of the plurality of pixels;

a display period Tri (i is 1, . . . or any one of n) is a period from when the number i bit of a digital video signal is input to each line of the pixels, until the next digital video signal is input to each line of the pixels, or a period until the electric potential of the power source for the erasing operation is applied to the second address electrodes which are possessed by each line of the pixels, respectively;

a non-display period Tdk (k is 1, . . . or any one of n) is a period from when the electric potential of the power source for the erasing operation is applied to the second address electrodes which are possessed by each line of the pixels, respectively, until the digital video signal is input to each line of the pixels;

after all of the n display periods Tr1, Tr2, . . . and Trn appeared, any one of the n display periods Tr1, Tr2, . . . , and Trn appears again;

white display or black display is selected, by the digital video signal, in the n display periods Tr1, Tr2, . . . , and Trn; and the ratio of lengths of the n display periods Tr1, Tr2, . . . , and Trn is represent by $2^0::2^1::2^2 \ldots, 2^{(n-1)}$.

According to the first structure of the present invention, there is provided a driving method of a micromirror device comprising a pixel portion and a power source for the erasing operation, characterized in that:

the pixel portion has a plurality of pixels;

each one of the plurality of pixels has a first address electrode and a second address electrode;

n display periods Tr1, Tr2 . . . and Trn and j non-display periods Td1, Td2, and Tdj appear within one frame period of each line of pixels of the plurality of pixels;

a display period Tri (i is 1, . . . or any one of n) is a period from when the number i bit of a digital video signal is input to each line of the pixels, until the next digital video signal is input to each line of the pixels, or a period until the electric potential of the power source for the erasing operation is applied to the second address electrodes which are possessed by each line of the pixels, respectively;

a non-display period Tdk (k is 1, . . . or any one of n) is a period from when the electric potential of the power source for the erasing operation is applied to the second address electrodes which are possessed by each line of the pixels, respectively, until the digital video signal is input to each line of the pixels;

after all of the n display periods Tr1, Tr2, . . . , and Trn appeared, any one of the n display periods Tr1, Tr2, . . . , and Trn appears again;

white display or black display is selected, by the digital video signal, in the n display periods Tr1, Tr2, . . . , and Trn; and the ratio of lengths of the n display periods Tr1, Tr2, ..., and Trn is represent by $2^0::2^1::2^2...,2^{(n-1)}$.

The first structure of the present invention may have a feature that the plurality of pixels each have a micromirror.

The first structure of the present invention may have a feature that white display or black display is selected, by the digital video signal, in the n display periods Tr1, Tr2, ..., and Trn.

The first structure of the present invention may have a feature that when the electric potential of the power source for the erasing operation is applied to the second address electrode, the micromirror is tilted in a direction so that black display is performed.

The first structure of the present invention may have a feature that the SRAM has two p-channel transistors and two n-channel transistors.

The first structure of the present invention may have a feature that the SRAM has two p-channel transistors and two resistors.

The first structure of the present invention may have a feature that the SRAM has two n-channel transistors and two resistors.

The first structure of the present invention includes a projector which is characterized by having the micromirror device.

According to a second structure of the present invention, there is provided a micromirrror device comprising a first data driver, a second data driver, a scanning driver, and a pixel portion, characterized in that:

the pixel portion has a plurality of pixels;

each of the plurality of pixels has a first switching transistor, a second switching transistor, a SRAM, a first address electrode, and a second address electrode;

the scanning driver controls a switching of the first switching transistor and a switching of the second switching transistor;

the first data driver inputs a digital signal to an input terminal of the SRAM and to the first address electrode through the first switching transistor;

the second data driver inputs a digital signal to an output terminal of the SRAM and the second address electrode through the second switching transistor;

the digital signal input to the input terminal is inverted, with an electric potential of a ground being a reference, to be output from the output terminal; and the digital signal input to the output terminal is inverted, with the electric potential of the ground being the reference, to be output from the input terminal.

According to the second structure of the present invention, there is provided a micromirror device comprising a first data driver, a second data driver, a scanning driver, a plurality of first scanning lines, a plurality of second scanning lines, a plurality of a first data lines, and a plurality of a second data lines, characterized in that:

the pixel portion has a plurality of pixels;

each of the plurality of pixels has a first switching transistor, a second switching transistor, a SRAM, a first address electrode, and a second address electrode;

a switching of the first switching transistor and a switching of the second switching transistor are controlled by scanning signals input from the scanning driver to the plurality of the first scanning lines and the plurality of the second scanning lines;

a digital signal input from the first data driver to the plurality of the first data lines, is input to an input terminal of the SRAM and to the first address electrode through the first switching transistor;

a digital signal input from the second data driver to the plurality of the second data lines, is input to an output terminal of the SRAM and to the second address electrode through the second switching transistor;

the digital signal input to the input terminal is inverted, with an electric potential of a ground being a reference, to be output from the output terminal; and the digital signal input to the output terminal is inverted, with the electric potential of the ground being the reference, to be output from the input terminal.

According to the second structure of the present invention, there is provided a micromirror device comprising a first data driver, a second data driver, a scan driver, and a pixel portion, characterized in that:

the pixel portion has a plurality of pixels;

each of the plurality of pixels has a first switching transistor, a second switching transistor, a SRAM, a first address electrode, and a second address electrode;

the scan driver controls a switching of the first switching transistor and a switching of the second switching transistor;

the first data driver inputs a digital signal to an input terminal of the SRAM and the first address electrode through the first switching transistor;

the second data driver inputs a digital signal to an output terminal of the SRAM and the second address electrode through the second switching transistor;

the digital signal input to the input terminal is inverted, with an electric potential of a ground being a reference, to be output from the output terminal; and the digital signal input to the output terminal is inverted, with the electric potential of the ground being the reference, to be output from the input terminal;

(n+j) display periods Tr1, Tr2 ... and Tr(n+j) appear in order within one frame period of each line of pixels of the plurality of pixels;

among the (n+j) display periods Tr1, Tr2 ... and Tr(n+j), j display period is a non-display period;

among the (n+j) display periods Tr1, Tr2 ... and Tr(n+j), white display or black display is selected by the digital signal within a display period, which is not the non-display period;

after all of the (n+j) display periods Tr1, Tr2, ..., and Tr(n+j) appeared, the (n+j) display periods Tr1, Tr2, ..., and Tr(n+j) appears, in order, again; and among the (n+j) display periods Tr1, Tr2 ... and Tr(n+j), the ratio of lengths of the display periods, which are not the non-display periods, are arranged in order from the shortest, is represent by $2^0::2^1::2^2...,2^{(n-n)}$.

According to the second structure of the present invention, there is provided a micromirror device comprising a first data driver, a second data driver, a scanning driver, a plurality of first scanning lines, a plurality of second scanning lines, a plurality of a first data lines, and a plurality of a second data lines, characterized in that:

the pixel portion has a plurality of pixels;

each of the plurality of pixels has a first switching transistor, a second switching transistor, a SRAM, a first address electrode, and a second address electrode;

a switching of the first switching transistor and a switching of the second switching transistor are controlled by scanning signals input from the scanning driver to the plurality of the first scanning lines and to the plurality of the second scanning lines;

a digital signal input from the first data driver to the plurality of the first data lines, is input to an input terminal of the SRAM and to the first address electrode through the first switching transistor;

a digital signal input from the second data driver to the plurality of the second data lines, is input to an output terminal of the SRAM and to the second address electrode through the second switching transistor;

the digital signal input to the input terminal is inverted, with an electric potential of a ground being a reference, to be output from the output terminal;

the digital signal input to the output terminal is inverted, with the electric potential of the ground being the reference, to be output from the input terminal;

(n+j) display periods Tr1, Tr2 . . . and Tr(n+j) appear in order within one frame period of each line of pixels of the plurality of pixels;

among the (n+j) display periods Tr1, Tr2 . . . and Tr(n+j), j display period is a non-display period;

among the (n+j) display periods Tr1, Tr2 . . . and Tr(n+j), white display or black display is selected by the digital signal within a display period, which is not the non-display period;

after all of the (n+j) display periods Tr1, Tr2, . . . , and Tr(n+j) appeared, the (n+j) display periods Tr1, Tr2, . . . , and Tr(n+j) appears, in order, again; and among the (n+j) display periods Tr1, Tr2 . . . and Tr(n+j), the ratio of lengths of the display periods, which are not the non-display periods, are arranged in order from the shortest, is represent by $2^0::2^1::2^2 \ldots, 2^{(n-1)}$.

According to the second structure of the present invention, there is provided a driving method of a micromirror device having a pixel portion, characterized in that:

the pixel portion has a plurality of pixels;

each of the plurality of the pixels has a first address electrode and a second address electrode;

(n+j) display periods Tr1, Tr2 . . . and Tr(n+j) appear in order within one frame period of each line of pixels of the plurality of pixels;

among the (n+j) display periods Tr1, Tr2 . . . and Tr(n+j), j display period is a non-display period;

among the (n+j) display periods Tr1, Tr2 . . . and Tr(n+j), white display or black display is selected by the digital signal within a display period, which is not the non-display period;

after all of the (n+j) display periods Tr1, Tr2, . . . , and Tr(n+j) appeared, the (n+j) display periods Tr1, Tr2, . . . , and Tr(n+j) appears, in order, again; and among the (n+j) display periods Tr1, Tr2 . . . and Tr(n+j), the ratio of lengths of the display periods, which are not the non-display periods, are arranged in order from the shortest, is represent by $2^0::2^1::2^2 \ldots, 2^{(n-1)}$.

The second structure of the present invention may have a feature that the (n+j) display periods Tr1, Tr2, . . . , and Tr(n+j) are periods from when the digital signal is written to the pixels in the (n+j) write in periods Ta1, Ta2, . . . , and Ta (n+j), until the digital signal is input to the pixels in the write in period which appears next to the (n+j) write in periods Ta1, Ta2, . . . , and Ta(n+j).

The second structure of the present invention may have a feature that among the (n+j) write in periods Ta1, Ta2, . . . , and Ta (n+j), an arbitrary write in period Tai does not overlap with a write in period which appears before two write in periods of the arbitrary write in period Tai and with a write in period which appears after two write in periods of the arbitrary write in period Tai.

The second structure of the present invention may have a feature that the plurality of pixels each have a micromirror.

The second structure of the present invention may have a feature that the SRAM has two p-channel transistors and two n-channel transistors.

The second structure of the present invention may have a feature that the SRAM has two p-channel transistors and two resistors.

The second structure of the present invention may have a feature that the SRAM has two n-channel transistors and two resistors.

The second structure of the present invention includes a projector which is characterized by having the micromirror device.

DETAILED DESCRIPTION OF THE PREFERRED EMBODIMENTS

Figure 1:
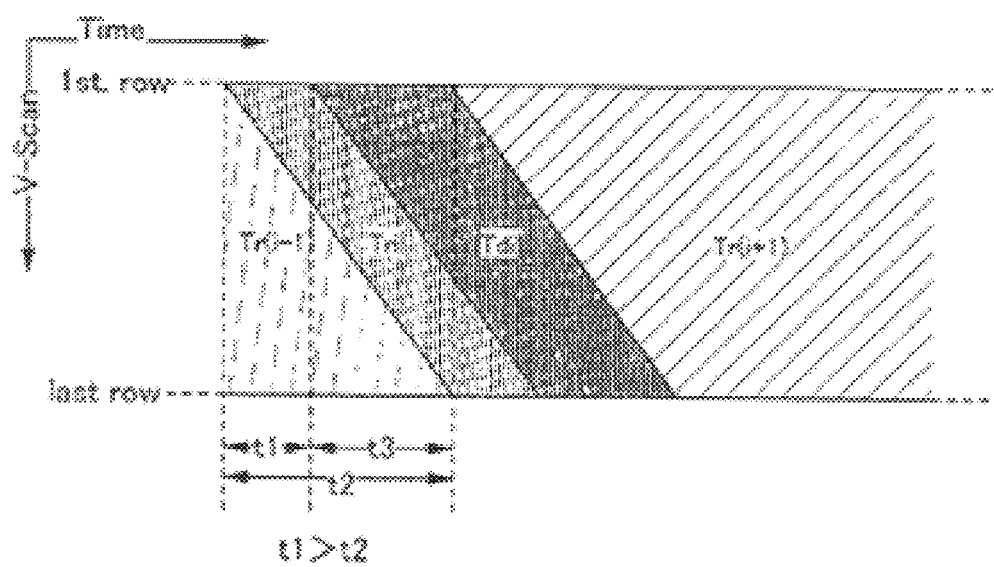
FIG. 1 is a diagram which shows simply a method of driving a first structure DMD of the present invention.
Figure 2:
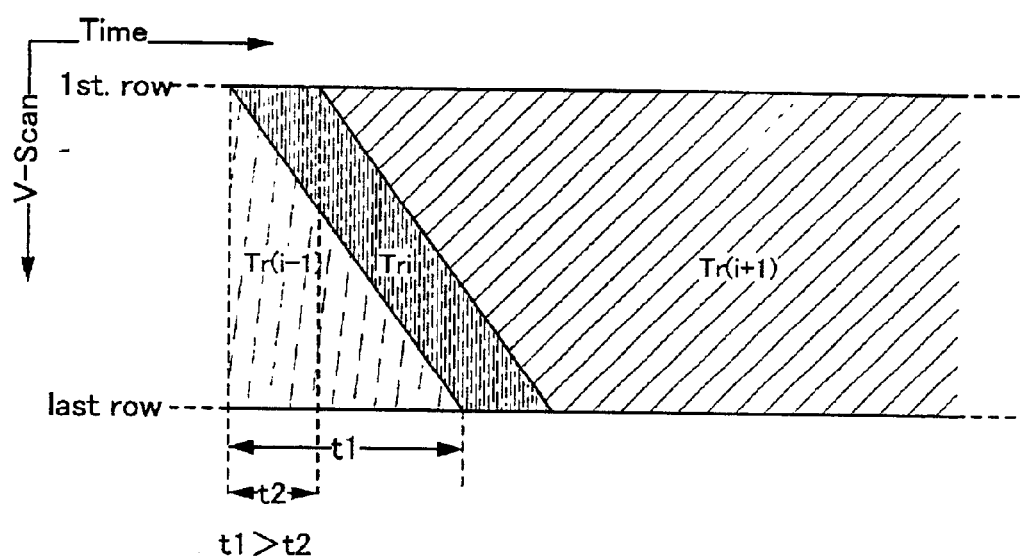
FIG. 2 is a diagram which shows simply a method of driving a second structure DMD of the present invention.
Figure 3:
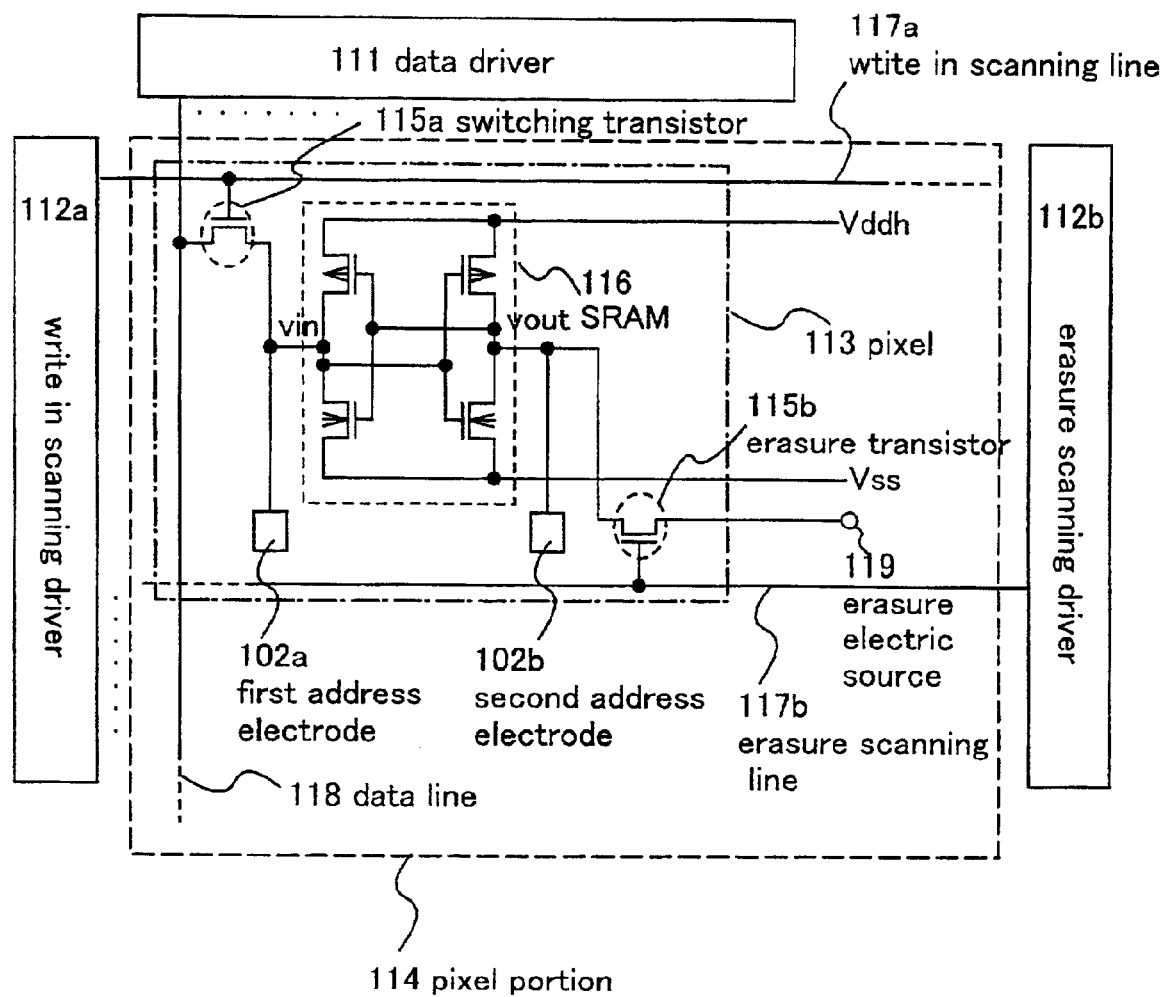
FIG. 3. is a diagram showing a pixel portion and a driver circuit of a first structure DMD of the present invention.

A circuit diagram of a first structure DMD of the present invention is shown in FIG. 3. Reference numeral 111 denotes a data driver, reference numeral 112a denotes a write in scanning driver, reference numeral 112b denotes an erasure scanning driver, and reference numeral 114 denotes a pixel portion. The pixel portion 114 has a plurality of pixels 113. Note that the write in scanning driver 112a and the erasure scanning driver 112b are referred to by the generic name a scanning driver 112.

Note also that, although a first structure is shown in this embodiment mode in which there are one each of the data driver 111, the write in scanning driver 112a, and the erasure scanning driver 112b, the first structure DMD of the present invention is not limited thereto. Further, the pixel portion 114, the data driver 111, the write in scanning driver 112a, and the erasure scanning driver 112b may be formed on the same substrate, and they may also be formed on different substrates and then be connected to the pixel portion 114 by using a means such as an FPC or TAB.

The data driver 111 inputs a digital video signal to a plurality of data lines 118. The write in scanning driver 112a then inputs a write in scanning signal to a plurality of write in scanning lines 117a. Further, the erasure scanning driver 112b inputs a write in scanning signal to a plurality of erasure scanning lines 117b.

Regions having one data line 118, one write in scanning line 117a, and one erasure scanning line 117b correspond to one pixel 113 for the case of the DMD shown by FIG. 3.

The pixel 113 has a switching transistor 115a and erasure transistor 115b, and a SRAM 116 having a plurality of transistors. A gate electrode of the switching transistor 115a is connected to the write in scanning line 117a. Further, a gate electrode of the erasure transistor 115b is connected to the erasure scanning line 117b.

The switching transistor 115a and the erasure transistor 115b may have a single gate structure, and may also have a multi-gate structure such as a double gate or triple gate structure. Further, n-channel transistors may be used for the switching transistor 115a and the erasure transistor 115b, and p-channel transistors may also be used.

One of a source region and a drain region of the switching transistor 115a is connected to the data line 118, while the other is connected to an input terminal Vin of the SRAM 116 and to a first address electrode 102a.

An output terminal Vout of the SRAM 116 is connected to a second address electrode 102b, and is connected to a source region or a drain region of the erasure transistor 117b.

The SRAM 116 may have a structure such that the electric potential of the input terminal and the electric potential of the output terminal are inverted, with ground taken as a reference point. It is therefore possible to use any type of SRAM as the SRAM 116 in the present invention, provided that it has a structure which satisfies the above condition. The term Vddh refers to an electric power source on a high voltage side, and the term Vss refers to an electric power source on a low voltage side.

Further, among the source region and the drain region of the erasure transistor 115b, the one which is not connected to the output terminal Vout of the SRAM 116 is connected to an erasure electric power source 119. The erasure electric power source 119 is maintained at an electric potential such that the pixel performs black display when the electric potential of the erasure electric power source 119 is imparted to the output terminal Vout of the SRAM 116. In practice, the erasure electric power source 119 is maintained at the same electric potential as the high voltage side electric power source Vddh, or the low voltage side electric power source Vss.

Further, although not shown in FIG. 3, a micromirror is formed on the first address electrode 102a and the second address electrode 102b of each pixel. The micromirror is formed so as not to contact the first address electrode 102a and the second address electrode 102b.

Figure 4:
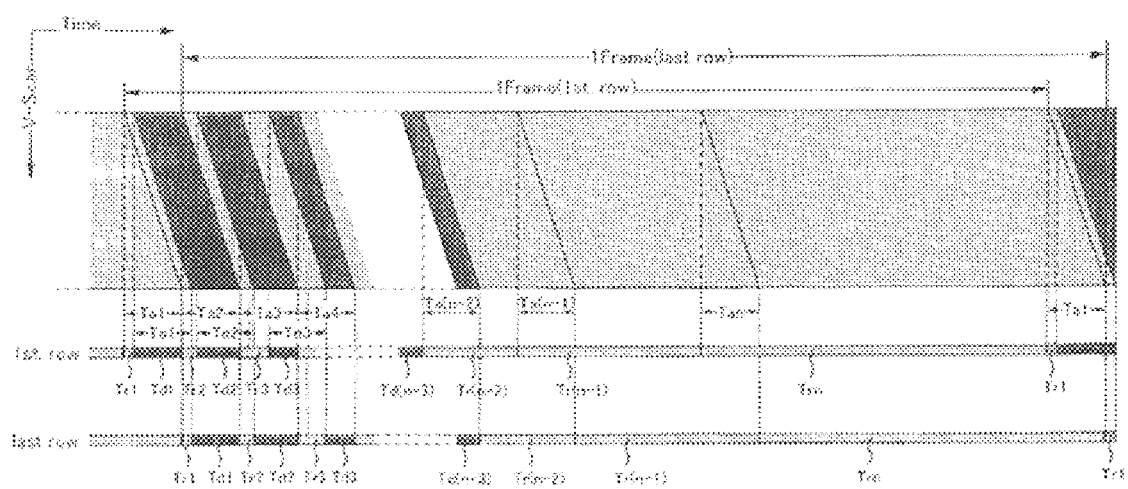
FIG. 4 is a diagram showing a method of driving a first structure DMD of the present invention.

Driving of the DMD shown in FIG. 3 is explained next using FIG. 4. The horizontal axis in FIG. 4 shows a time scale, and the vertical axis shows the position of a scanning line.

A write in period Ta1 begins in the DMD shown in FIG. 3. When the write in period Ta1 begins, the switching transistors 115a of a first line of pixels are selected in accordance with a write in scanning signal input to the write in scanning line 117a from the write in scanning driver 112. Note that, in this specification, the term selection of a wiring refers to a state in which all transistors whose gate electrode is connected to the wiring are placed in an ON state. Further, the term first line of pixels refers to pixels having the switching transistor 115a whose gate electrode is connected to the first line of the write in scanning lines 117a.

The first bit of the digital video signal is then input to the data lines 118 from the data driver 111. The input first bit of the digital video signal is then input to the first address electrode 102a and to the input terminal Vin of the SRAM 116, through the switching transistor 115a in the ON state. The first bit of the digital video signal input to the input terminal Vin of the SRAM 116 is inverted with the ground electric potential taken as a reference, output from the output terminal Vout as the first bit of an inverted digital video signal, and input to the second address electrode 102b.

If the digital video signal and the inverted digital video signal are input to the first address electrodes 102a and to the second address electrodes 102b, respectively, then the angles of the micromirrors of the pixels, with respect to the substrate, are selected in accordance with the "1" or "0" information in the digital video signal. Whether light from a light source is irradiated to a screen, or whether the light from the light source is irradiated to a light absorber, is selected when the angle with respect to the substrate is selected.

The digital video signal is then input in order to all of the lines of pixels 113, and the micromirror angles are selected. Note that, in this specification, the term digital video signal is input to the pixel 113 refers to the digital video signal being input to the source region or to the drain region of the switching transistor 115 of the pixel 113.

A period up until the digital video signal is input to all of the pixels is the write in period Ta1.

On the other hand, an erasure period Te1 begins before the write in period Ta1 is complete. The erasure transistors 115b of the first line of pixels are selected in accordance with an erasure scanning signal input to the erasure scanning lines 117b from the erasure scanning driver 112b when the erasure period Te1 begins.

The electric potential of the erasure electric power source (hereafter referred to as an erasure electric potential) is imparted to the output terminals Vout of the SRAMs 116 and to the second address electrodes 102b, through the erasure transistors 115b, when the erasure transistors 115b are selected.

An electric potential which is inverted with the ground electric potential as a reference (hereafter referred to as an inverted erasure electric potential) is imparted to the input terminals Vin of the SRAMs 116 when the erasure electric potential is imparted to the output terminals Vout of the SRAMs 116.

The micromirrors are inclined in a direction such that light from the light source is irradiated to the light absorber when the erasure electric potential and the inverted erasure electric potential are imparted to the output terminal Vout and to the input terminal Vin of the SRAM 116, respectively, and the pixels perform black display.

The erasure transistors 115b of all of the lines of pixels are then selected in order, and all perform black display. The erasure period Te1 is complete when all of the erasure scanning lines 117b are selected.

On the other hand, a write in period Ta2 again begins either before or after the erasure period Te1 is complete, and the second bit of the digital video signal is written to the pixels.

The above operations are repeated until the number m bit of the digital video signal is input to the pixels, and display periods Tr and non-display periods Td repeatedly appear. Note that the display periods Tr for performing actual display differ for each line of pixels in accordance with each bit of the digital video signal. The display periods Tr1 to Tr (m−1) are periods from when the switching transistors 115a are selected until the erasure transistors 115b of the same pixels are next selected. In particular, the display period Tr of the first line of pixels is the same as the period from when the write in period Ta begins until the next erasure period Te to appear begins.

Non-display periods Td for performing black display also differ with each line of pixels. The non-display periods Td are periods from the selection of the erasure transistors 115b until the switching transistors 115a are next selected. In particular, the non-display period Td of the first line of pixels is the same as the period from when the erasure period Te begins until the next write in period Ta to appear begins.

The number m bit of the digital video signal is then input to the pixels when the write in period Tam begins. In order to simplify the explanation, an example of a case in which m=n−2 is shown in FIG. 4, but the present invention is of course not limited to this example. It is possible to arbitrarily select the value of m from 1 to n.

Then, after the write in period Tam is complete, but not an erasure period, the next write in period Ta(m+1)[n−1] begins. The number (m+1)[n−1] bit of the digital video signal is input to the pixels when the write in period Ta(m+1)[n−1] begins.

The above operations are repeated until the number n bit of the digital video signal is input to the pixels, and the display periods Tr appear in succession. Note that the display periods Tr for performing actual display differ for each line of pixels in accordance with each bit of the digital video signal. The display periods Trm to Trn are periods from when the switching transistors 115a of the pixels are selected until the switching transistors 115a of the same pixels are again selected. In particular, the display period Tr of the first line of pixels is the same as a period from when the write in period Ta begins until the next write in period Ta to appear begins.

One image can be displayed when all of the display periods Tr1 to Trn are complete. A period in which one image is displayed is referred to as one frame period F in the present invention. Note that the frame period F differs for each line of pixels in the driving method of the present invention. The frame period of the final line of pixels begins when a time nearly as long as the write in period Ta1 is passed, after the frame period of the first line of pixels begins.

Note that the first write in period Ta1 of the next frame period begins at the same time as the display period Trn is completed, and that the above operations are again repeated.

It is generally preferable to form 60 or more frame periods in one second in display which displays an image. If the number of images displayed in one second is less than 60, then visual flicker of the image begins to become conspicuous.

Further, it is very important that the sum of the lengths of all of the write in periods be shorter than the length of one frame period with the present invention. It is necessary that the lengths of the display periods be set such that $Tr1:Tr2:Tr3: \ldots : Tr(n-1):Trn = 2^0:2^1:2^2: \ldots :2^{(n-2)}:2^{(n-1)}$. The desired gray scale display, from among $2^n$ gray scales, can be performed by combining these display periods.

The gray scale displayed in a pixel during one frame period is set in accordance with finding the total sum of the lengths of the display periods in which light is irradiated to the screen within the one frame period. For example, if light being irradiated to the screen in all display periods when n=8 is taken as the pixels displaying a brightness of 100, then one gray scale can be expressed in the pixel when light is irradiated to the screen only during Tr1 and Tr2. If light is irradiated to the screen only in Tr3, Tr5, and Tr8, then a gray scale of 60 can be expressed in the pixel.

It is essential that the write in period Tam for writing the number m bit of the digital video signal into the pixels have a length which is shorter than the length of the display period Trm. It is therefore necessary that the value of the bit number m be a value from 1 to n such that the write in period Tam is shorter than the length of the display period Trm.

Furthermore, the display periods Tr1 to Trn may appear in any order. For example, it is possible for the display periods to appear in an order in which Tr3, Tr5, Tr2, . . . follow Tr1 in one frame period. However, it is very important that an order is chosen so that the write in periods Ta1 to Tan do not mutually overlap. Further, the erasure periods Te1 to Ten must also all be chosen in an order such that they do not mutually overlap.

Figure 5:
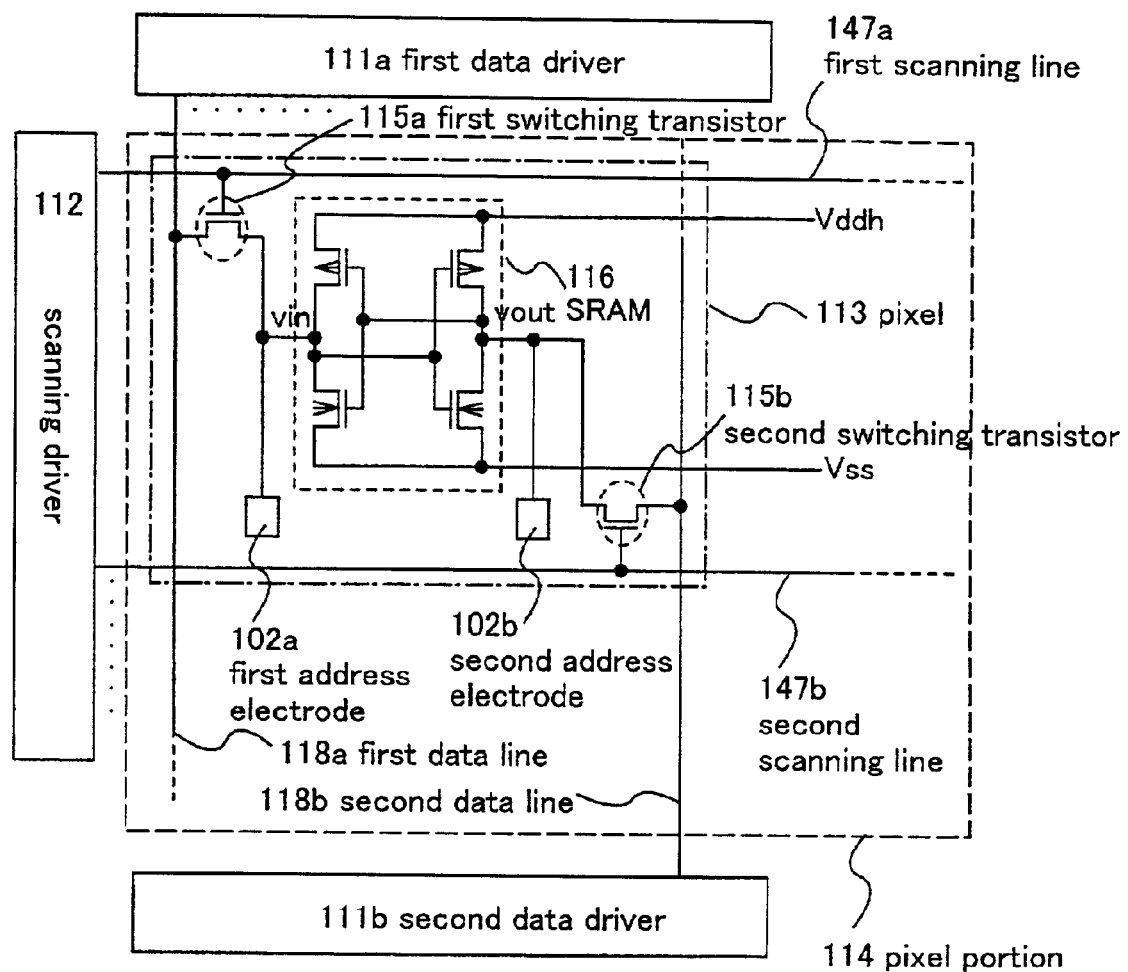
FIG. 5. is a diagram showing a pixel portion and a driver circuit of a second structure DMD of the present invention.

Next, a circuit diagram of a second structure DMD of the present invention is shown in FIG. 5. Reference numeral 111a denotes a first data driver, reference numeral 111b denotes a second data driver, reference numeral 112 denotes a scanning driver, and 114 denotes the pixel portion. The pixel portion 114 has a plurality of the pixels 113. Note that the first data driver 111a and the second data driver 111b are referred to by the generic name data driver 111.

Note also that, although a structure is shown in the embodiment mode in which there is one scanning driver 112 with the second structure, the present invention is not limited to the second structure DMD. A structure having two or more of the scanning drivers 112 may also be used. Further, the pixel portion 114, the data driver 111, and the scanning driver 112 may be formed on the same substrate, and they may also be formed on different substrates and then be connected to the pixel portion 114 by using a means such as an FPC or TAB.

The first data driver 111a inputs a digital video signal to a plurality of first data lines 118a. The second data driver 111b inputs the digital video signal to a plurality of second data lines 118b. The scanning driver 112 then inputs a scanning signal to a plurality of first scanning lines 147a and to a plurality of second scanning lines 147b.

Regions having one first data line 118a, one second data line 118b, and one first scanning line 147a, and one second scanning line 147b correspond to one pixel 113 for the case of the DMD shown by FIG. 5.

The pixel 113 has a first switching transistor 115a, a second switching transistor 115b, and the SRAM 116 having a plurality of transistors. The gate electrode of the first switching transistor 115a is connected to the first scanning line 147a. Further, the gate electrode of the second switching transistor 115b is connected to the second scanning line 147b.

The first switching transistor 115a and the second switching transistor 115b may have a single gate structure, and may also have a multi-gate structure such as a double gate or triple gate structure. Further, n-channel transistors may be used for the first switching transistor 115a and the second switching transistor 115b, and p-channel transistors may also be used.

One of a source region and a drain region of the first switching transistor 115a is connected to the first data line 118a, while the other is connected to the input terminal Vin of the SRAM 116 and to the first address electrode 102a.

One of a source region and a drain region of the second switching transistor 115b is connected to the second data line 118b, while the other is connected to the output terminal Vout of the SRAM 116 and to the second address electrode 102b.

The SRAM 116 may have a structure such that the electric potential of the input terminal and the electric potential of the output terminal are inverted, with ground taken as a reference point. It is therefore possible to use any type of SRAM as the SRAM 116 in the present invention, provided that it has a structure which satisfies the above condition. The term Vddh refers to an electric power source on the high voltage side, and the term Vss refers to an electric power source on the low voltage side.

Further, although not shown in FIG. 5, a micromirror is formed on the first address electrode 102a and the second address electrode 102b of each pixel. The micromirror is formed so as not to contact the first address electrode 102a and the second address electrode 102b.

Figure 6:
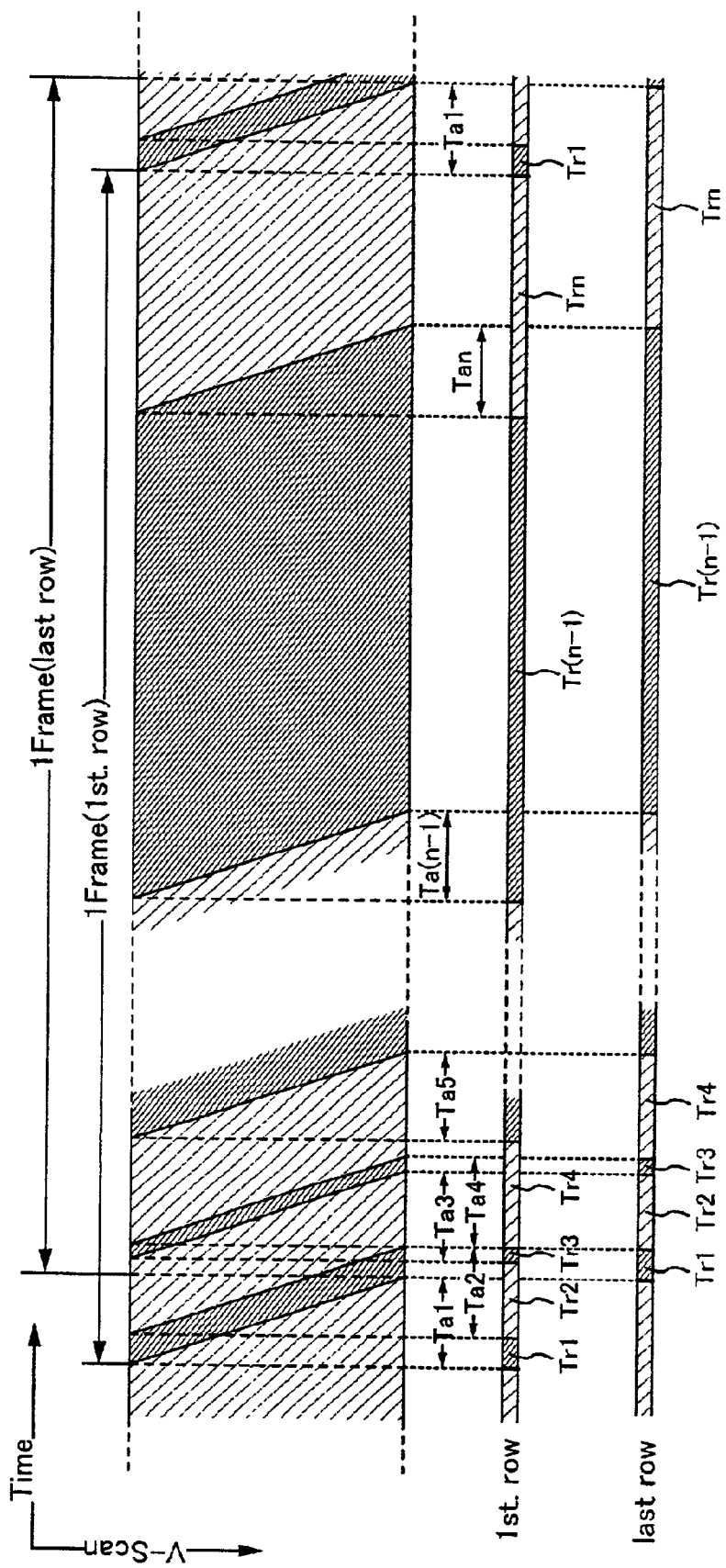
FIG. 6 is a diagram showing a method of driving a second structure DMD of the present invention.

Driving of the DMD shown in FIG. 5 is explained next using FIG. 6. The horizontal axis in FIG. 6 shows a time scale, and the vertical axis shows the position of a scanning line.

A write in period Ta1 begins in the DMD shown in FIG. 5. When the write in period Ta1 begins, the first switching transistors 115a of a first line of pixels are selected in accordance with a scanning signal input to the first scanning line 147a from the scanning driver 112. Note that, in this specification, the term selection of a wiring refers to a state in which all transistors whose gate electrode is connected to the wiring are placed in an ON state. Further, the term first line of pixels refers to pixels having the gate electrodes of their first switching transistor 115a and their second switching transistor 115b connected to the first scanning line 147a and to the second scanning line 147b, respectively.

The first bit of the digital video signal is then input to the first data lines 118a from the first data driver 111a. The input first bit of the digital video signal is then input to the first address electrode 102a and to the input terminal Vin of the SRAM 116, through the first switching transistor 115a in an ON state. The first bit of the digital video signal input to the input terminal Vin of the SRAM 116 is inverted with the ground electric potential taken as a reference, output from the output terminal Vout as the first bit of an inverted digital video signal, and input to the second address electrode 102b.

If the digital video signal and the inverted digital video signal are respectively input to the first address electrodes 102a and to the second address electrodes 102b, then the angles of the micromirrors of the pixels, with respect to the substrate, are selected in accordance with the 1" or 0" information in the digital video signal. Whether light from a light source is irradiated to a screen, or whether the light from the light source is irradiated to a light absorber, is determined when the angle with respect to the substrate is selected.

The first scanning lines 147a are then selected in order, and the first bit of the digital video signal is input to all of the lines of pixels 113. The angles of the micromirrors of all of the pixels are therefore selected. Note that, in this specification, the term digital video signal input to the pixel 113 refers to the digital video signal being input to the source region or to the drain region of the first switching transistor 115a or the second switching transistor 115b of the pixel 113.

A period up until the first bit of the digital video signal is input to all of the pixels is the write in period Ta1.

On the other hand, a write in period Ta2 begins before or after the write in period Ta1 is complete. The second switching transistors 115b of the first line of pixels are selected in accordance with the scanning signal input to the second scanning lines 147b from the scanning driver 112 when the write in period Ta2 begins.

The second bit of the digital video signal is then input to the second data lines 118b from the second data driver 111b. The input second bit of the digital video signal is then input to the second address electrode 102b and to the output terminal Vout of the SRAM 116, through the second switching transistor 115b in an ON state. The second bit of the digital video signal input to the input terminal Vin of the SRAM 116 is inverted with the ground electric potential taken as a reference, output from the input terminal Vin as the second bit of the inverted digital video signal, and input to the first address electrode 102a.

If the inverted digital video signal and the digital video signal are input to the first address electrodes 102a and to the second address electrodes 102b, respectively, then the angles of the micromirrors of the pixels, with respect to the substrate, are selected in accordance with the 1" or 0" information in the digital video signal. Whether light from the light source is irradiated to the screen, or whether the light from the light source is irradiated to the light absorber, is selected when the angle with respect to the substrate is selected.

The second scanning lines 147b are then selected in order, and the second bit of the digital video signal is input to all of the lines of pixels 113. The angles of the micromirrors of all of the pixels are therefore selected.

A period up until the second bit of the digital video signal is input to all of the pixels is the write in period Ta2.

The above operations are repeated until the number n bit of the digital video signal is input to the pixels. Note that the display periods Tr for performing actual display differ for each line of pixels in accordance with each bit of the digital video signal. The display periods Tr1 to Trn are periods from when the digital video signal is input to each line of pixels, until the next bit of the digital video signal is input to the same pixels. In particular, the arbitrary display period Tr of the first line of pixels is the same as a period from when an arbitrary write in period begins until the next write in period to appear begins.

One image can be displayed when all of the display periods Tr1 to Trn are complete. A period in which one image is displayed is referred to as one frame period F in the present invention. Note that the frame period F differs for each line of pixels in the driving method of the present invention. The frame period of the final line of pixels begins when a time nearly as long as the write in period Ta1 is passed, after the frame period of the first line of pixels begins.

Note that the first write in period Ta1 of the next frame period begins at the same time as the display period Trn is completed, and that the above operations are repeated again.

It is generally preferable to form 60 or more frame periods every one second in display which displays an image. If the number of images displayed in one second is less than 60, then visual flicker of the image begins to become conspicuous.

Further, it is very important that the ratio of the lengths of all of the display periods Tr be set such that $2^0:2^1:2^2: \ldots : 2^{(n-2)}:2^{(n-1)}$ in the present invention if the display periods Tr are lined up in order from the shortest one. The desired gray scale display, from among $2^n$ gray scales, can be performed by combining these display periods.

The gray scale displayed in a pixel during one frame period is set in accordance with finding the total sum of the lengths of the display periods in which light is irradiated to the screen within one frame period. For example, if light being irradiated to the screen in all display periods when n=8 is taken as the pixels displaying a brightness of 100, then one gray scale can be expressed when light is irradiated to the screen only during the display periods whose length ratios correspond to $2^0$ and $2^1$. If light is irradiated to the screen only in the display periods whose length ratios correspond to $2^2$, $2^4$, and $2^7$, then the pixel can express a gray scale of 60.

Further, it is essential that an arbitrary write in period does not mutually overlap with its two neighboring write in periods. For example, it is necessary that a write in period Tai does not overlap with a write in period Ta(i+2) and does not overlap with a write in period Ta(i−2).

Further, the first scanning line 147a and the second scanning line 147b are selected in order in write in periods appearing in succession in this embodiment mode, but it is not necessary to limit the present invention to this structure. For cases in which adjacent write in periods overlap, it is necessary to perform write in of the digital signal by selecting the first scanning line in one of the adjacent write in periods, and selecting the second scanning line in the other write in period. However, there is no such limitation for cases in which neighboring write in periods do not overlap, and the first scanning line may be selected in both of the write in periods, and the second scanning line may also be selected in both of the write in periods.

The mechanism of a method of driving a micromirror is explained in detail next using FIGS. 7A and 7B. A micromirror 104 is connected to a standard electric power source 140. The standard electric power source 140 is always maintained at a fixed reference electric potential. The reference electric potential is shown as 5 V in FIGS. 7A and 7B in order to make the explanation easier to understand, but the reference electric potential is not limited to this value in the present invention. It is possible to set the reference electric potential to any value, provided that it is not an average electric potential between the HI electric potential of the digital video signal and the LO electric potential of the digital video signal.

Figure 7A:
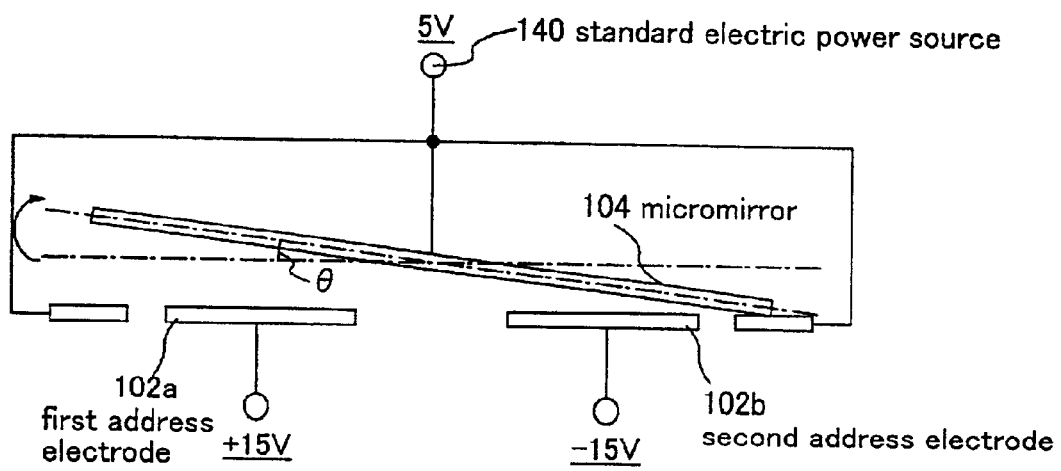
FIGS. 7A and 7B are diagrams showing DMD micromirror driving of the present invention.

The digital video signal is input to the first address electrode 102a in FIG. 7A, and the inverted digital video signal is input to the second address electrode 102b.

Figure 7B:
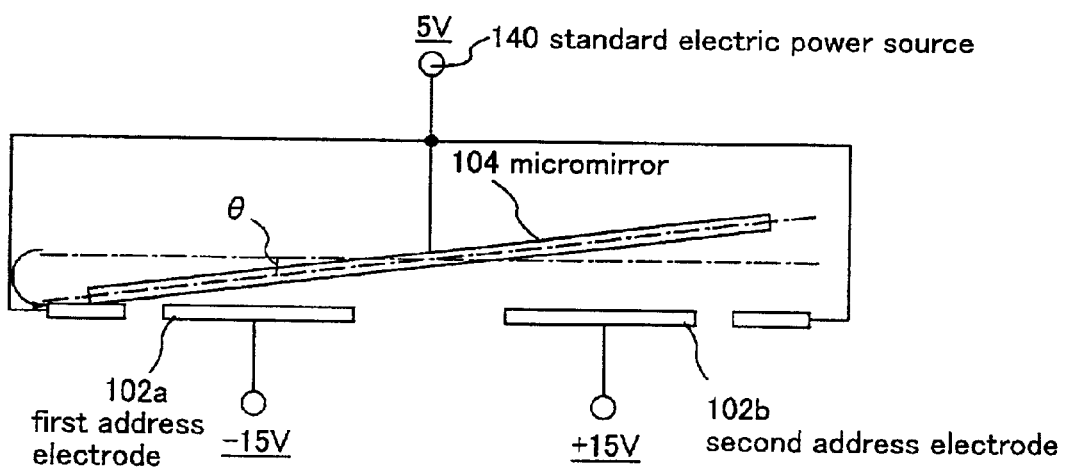

Note that, although an explanation is made in which the HI digital video signal is +15 V, and the LO digital video signal is −15 V, with FIGS. 7A and 7B, the present invention is not limited to those values.

Note also that the digital video signal has "0" or "1" information, and that one of the "0" or the "1" digital video signals is a signal having HI voltage, while the other is a signal having LO voltage.

The HI digital video signal is input to the first address electrode 102a, and the LO inverted digital video signal is input to the second address electrode 102b in FIG. 7A. In this case, a voltage of 10 V is formed between the micromirror 104 and the first address electrode 102a. Further, a voltage of 20 V is formed between the micromirror 104 and the second address electrode 102b. The micromirror 104 is therefore inclined by an angle θ from the reference surface to the second address electrode 102b side by the electric field action. Note that the micromirror 104 becomes a reference surface in a state during which the digital video signal is not input to the first and the second address electrodes 102a and 102b. The reference surface is parallel to the substrate.

The LO digital video signal is input to the first address electrode 102a, and the HI inverted digital video signal is input to the second address electrode 102b in FIG. 7B. In this case, a voltage of 20 V is formed between the micromirror 104 and the first address electrode 102a. Further, a voltage of 10 V is formed between the micromirror 104 and the second address electrode 102b. The micromirror 104 is therefore inclined by an angle θ from the substrate surface to the first address electrode 102a side.

It is possible to perform high speed switching at 15 sec with the DMD, and it is suitable for time division gray scale display.

Note that, although the digital video signal is input to the first address electrode 102a, and the inverted digital video signal is input to the second address electrode 102b in FIGS. 7A and 7B, the operation can be explained similarly for the reverse case.

It becomes possible to perform write in of an arbitrary digital video signal to the pixels, and write in of the next digital video signal to the pixels, in parallel in accordance with the above stated drive of the present invention. It also becomes possible to make the display period shorter than the length of the period for performing write in of the digital video signal to all of the pixels.

In other words, compared to conventional DMD time division gray scale display, it becomes possible to make the length of the display period corresponding to a conventional subframe period shorter with the DMD time division gray scale display of the present invention. It consequently becomes possible to make the number of image gray scales very high even if the write in speed of the digital video signal to the pixels is the same as the conventional.

Embodiments

Embodiments of the present invention are explained below.

[Embodiment 1]

Figure 8:
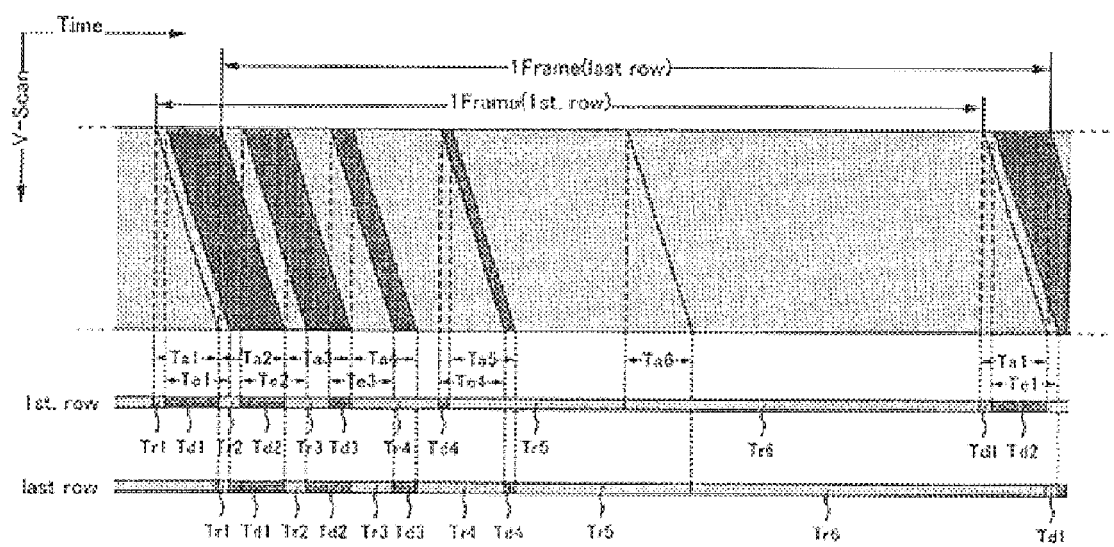
FIG. 8 is a diagram showing a method of driving a first structure DMD of the present invention.

A case of performing $2^6$ gray scales of display in the first structure DMD of the present invention, by using a 6 bit digital video signal, is explained in embodiment 1 using FIG. 8. Note that the DMD of embodiment 1 has the structure shown in FIG. 3 and in FIGS. 7A and 7B. The horizontal axis shows a time scale in FIG. 8, while the vertical axis shows the position of a scanning line.

First, the write in period Ta1 begins. When the write in period Ta1 begins, the switching transistors 115a of the first line of pixels are selected in accordance with a write in scanning signal input to the write in scanning line 117a from the write in scanning driver 112a.

The first bit of the digital video signal is then input to the data lines 118 from the data driver 111. The input first bit of the digital video signal is then input to the first address electrode 102a and to the input terminal Vin of the SRAM 116, through the switching transistor 115a in the ON state. The first bit of the digital video signal input to the input terminal Vin of the SRAM 116 is inverted with the ground electric potential taken as a reference, output from the output terminal Vout as the first bit of an inverted digital video signal, and input to the second address electrode 102b.

If the digital video signal and the inverted digital video signal are input to the first address electrodes 102a and to the second address electrodes 102b, then the angles of the micromirrors 104 of the pixels, with respect to the substrate, are selected in accordance with the 1" or 0" information in the digital video signal. Whether light from a light source is irradiated to a screen, or whether the light from the light source is irradiated to a light absorber, is selected when the angle with respect to the substrate is selected.

The digital video signal is then input in order to all of the lines of pixels 113, and the micromirror angles are selected. A period up until the first bit of the digital video signal is input to all of the pixels is the write in period Ta1.

On the other hand, the erasure period Te1 begins before the write in period Ta1 is complete. The erasure transistors 115b of the first line of pixels are selected in accordance with an erasure scanning signal input to the erasure scanning lines 117b from the erasure scanning driver 112b when the erasure period Te1 begins.

The electric potential of the erasure electric power source (hereafter referred to as erasure electric potential) is imparted to the output terminals Vout of the SRAMs 116 and to the second address electrodes 102b, through the erasure TFTs 115b, when the erasure transistors 115b are selected.

An electric potential which is inverted with the ground electric potential as a reference (inverted erasure electric potential) is imparted to the input terminals Vin of the SRAMs 116 when the erasure electric potential is imparted to the output terminals Vout of the SRAMs 116.

The micromirrors are inclined in a direction such that light from the light source is irradiated to the light absorber when the erasure electric potential and the inverted erasure electric potential are imparted to the output terminal Vout and to the input terminal Vin of the SRAM 116, respectively, and the pixels perform black display.

The erasure transistors 115b of all of the lines of pixels are then selected in order, and all perform black display. The erasure period Te1 is complete when all of the erasure scanning lines 117b are selected.

On the other hand, the write in period Ta2 begins either before or after the erasure period Te1 is complete, and the second bit of the digital video signal is written to the pixels, and the angles of the micromirrors 104 are selected.

The above operations are repeated until the number 5 bit of the digital video signal is input to the pixels, and display periods Tr and non-display periods Td repeatedly appear. Note that the display periods Tr for performing actual display differ for each line of pixels in accordance with each bit of the digital video signal. The display periods Tr1 to Tr4 are periods from when the switching transistors 115a are selected until the erasure transistors 115b of the same pixels are next selected. In particular, the display period Tr of the first line of pixels is the same as the period from when the write in period Ta begins until the next erasure period Te to appear begins.

The non-display periods Td1 to Td4 for performing black display in all the pixels also differ with each line of pixels. The non-display periods Td are periods from the selection of the erasure transistors 115b until the switching transistors 115a are next selected. In particular, the non-display period Td of the first line of pixels is the same as the period from when the erasure period Te begins until the next write in period Ta to appear begins.

The number 5 bit of the digital video signal is then input to the pixels when the write in period Ta5 begins. Then, after the write in period Ta5 is complete, not an erasure period but the next write in period Ta6 begins. The number 6 bit of the digital video signal is input to the pixels when the write in period Ta6 begins.

The display periods Tr5 and Tr6 thus appear in succession, as stated above. Note that the display periods Tr for performing actual display differ for each line of pixels in accordance with each bit of the digital video signal. The display periods Tr5 and Tr6 are periods from when the switching transistors 115a are selected until the switching transistors 115a of the same pixels are again next selected. In particular, the display period Tr of the first line of pixels is the same as a period from when the write in period Ta begins until the next write in period Ta to appear begins.

One image can be displayed when all of the display periods Tr1 to Tr6 are complete.

Note that the first write in period Ta1 of the next frame period begins when one frame period is complete or the same time as the display period Tr6 is completed, and that the above operations are then repeated.

It is necessary that the lengths of the display periods be set such that $Tr1:Tr2:Tr3: \ldots :Tr6=2^0:2^1:2^2: \ldots :2^6$ in 1 embodiment. The desired gray scale display, from among $2^6$ gray scales, can be performed by combining these display periods.

The gray scale displayed in a pixel during one frame period is set in accordance with finding the total sum of the lengths of the display periods in which light is irradiated to the screen within one frame period. For example, if light irradiated to the screen in all of the display periods is taken as the pixels displaying a brightness of 100 for the case of embodiment 1, then a gray scale of 5 can be expressed when light is irradiated to the screen only during Tr1 and Tr2. If light is irradiated to the screen only during Tr3 and Tr5, then a gray scale of 32 can be expressed in the pixel.

It is essential that the write in period Ta5 for writing the number 5 bit of the digital video signal into the pixels have a length which is shorter than the length of the display period Tr5.

Furthermore, the display periods Tr1 to Tr6 may appear in any order. For example, it is possible for the display periods to appear in an order in which Tr3, Tr5, Tr2, . . . follow Tr1 in one frame period. However, it is very important that an order is chosen so that the write in periods Ta1 to Ta6 do not mutually overlap. Further, the erasure periods Te1 to Te6 must also all be chosen such that they do not mutually overlap.

It becomes possible to make the length of the display period corresponding to a conventional subframe period shorter with the DMD time division gray scale display of the present invention, in comparison with conventional DMD time division gray scale display. Consequently, it becomes possible to make the number of image gray scales very high even if the write in speed of the digital video signal to the pixels is the same as the conventional.

[Embodiment 2]

The order of appearance of the display periods Tr1 to Tr6 in a method of driving the first structure DMD of the present invention corresponding to a 6 bit digital video signal is explained in embodiment 2.

Figure 9:
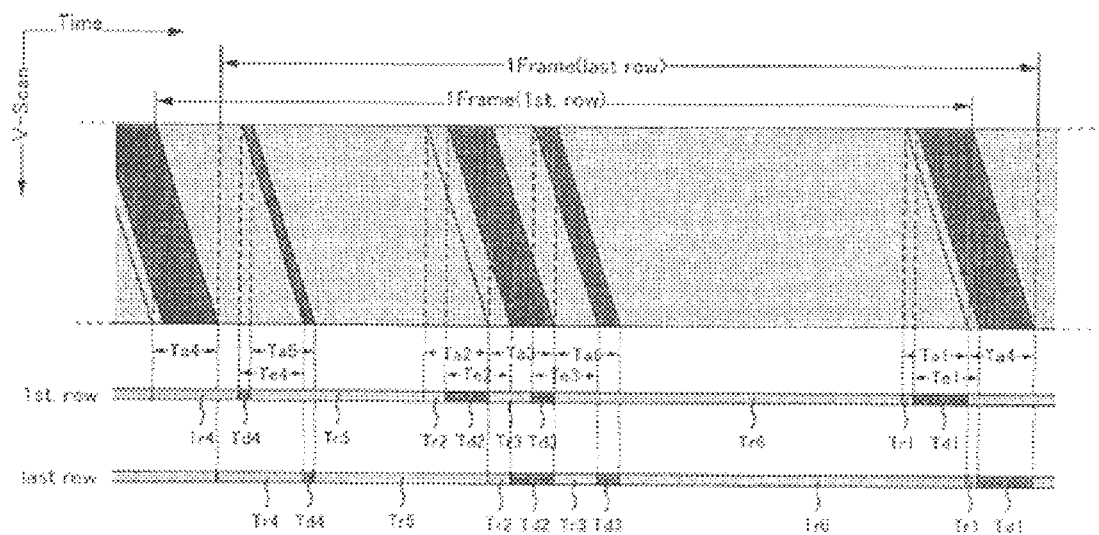
FIG. 9 is a diagram showing the method of driving a first structure DMD of the present invention.

FIG. 9 shows a timing chart of the driving method of embodiment 2. Embodiment 1 may be referred to for the detailed driving mechanism for a pixel, and therefore such explanation is omitted here. The longest non-display period within one frame period (Td1 in embodiment 2) is formed at the end of one frame period in the driving method of embodiment 2. With the above structure, it becomes visible to a viewer that there is a cutoff of the frame period between the non-display period Td1 and the first display period of the next frame period (Tr4 in embodiment 2). Display irregularities, which occur due to adjoining display periods for emitting light in neighboring frame periods when performing an intermediate gray scale display, can thus be made more difficult to recognize in the viewer's eyes.

Note that, although a case of a 6 bit digital video signal is explained in embodiment 2, the present invention is not limited by such. It is possible to implement embodiment 2 without placing any limitations on the number of digital video signal bits.

[Embodiment 3]

Figure 10:
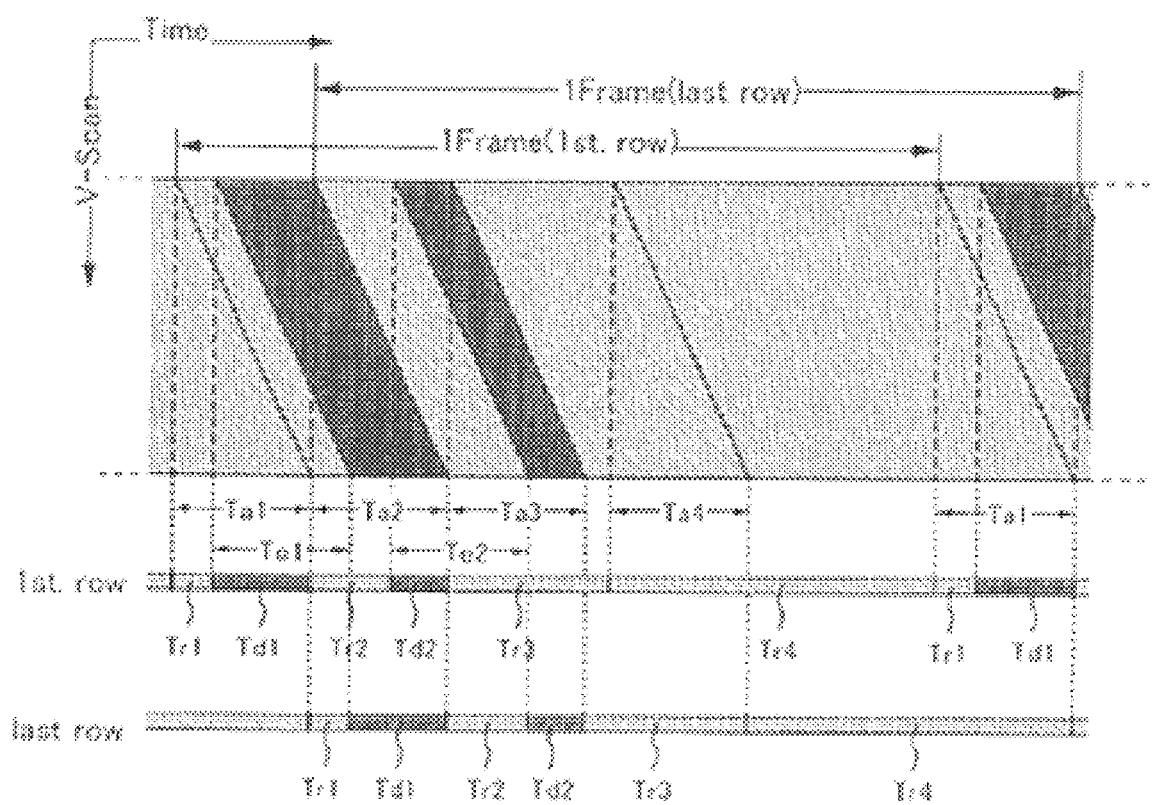
FIG. 10 is a diagram showing the method of driving a first structure DMD of the present invention.

A case of performing $2^4$ gray scales of display in the first structure DMD of the present invention, by using a 4 bit digital video signal, is explained in embodiment 3 using FIG. 10. In FIG. 10 the horizontal axis shows a time scale, while the vertical axis shows the position of a scanning line. Note that the DMD of embodiment 3 has the structure shown in FIG. 3 and in FIGS. 7A and 7B.

First, the write in period Ta1 begins. When the write in period Ta1 begins, the switching transistors 115a of the first line of pixels are selected in accordance with a write in scanning signal input to the write in scanning line 117a from the write in scanning driver 112a. Note that, in this specification, the term selection of a wiring refers to a state in which all transistors whose gate electrode is connected to the wiring are placed in an ON state. Further, the term first line of pixels refers to pixels having the switching transistor whose gate electrode is connected to the first line of the write in scanning lines.

The first bit of the digital video signal is then input to the data lines 118 from the data driver 111. The input first bit of the digital video signal is then input to the first address electrode 102a and to the input terminal Vin of the SRAM 116, through the switching transistor 115a in the ON state. The first bit of the digital video signal input to the input terminal Vin of the SRAM 116 is inverted with the ground electric potential taken as a reference, output from the output terminal Vout as the first bit of an inverted digital video signal, and input to the second address electrode 102b.

If the digital video signal and the inverted digital video signal are input to the first address electrodes 102a and to the second address electrodes 102b, then the angles of the micromirrors 104 of the pixels, with respect to the substrate, are selected in accordance with the 1" or 0" information in the digital video signal. Whether light from a light source is irradiated to a screen, or whether the light from the light source is irradiated to a light absorber, is selected when the angle with respect to the substrate is selected.

The digital video signal is then input in order to all of the lines of pixels 113, and the micromirror angles are selected. A period up until the first bit of the digital video signal is input to all of the pixels is the write in period Ta1.

On the other hand, the erasure period Te1 begins before the write in period Ta1 is complete. The erasure transistors 115b of the first line of pixels are selected in accordance with an erasure scanning signal input to the erasure scanning lines 117b from the erasure scanning driver 112b when the erasure period Te1 begins.

The electric potential of the erasure electric power source (hereafter referred to as erasure electric potential) is imparted to the output terminals Vout of the SRAMs 116 and to the second address electrodes 102b, through the erasure transistors 115b, when the erasure transistors 115b are selected.

An electric potential which is inverted with the ground electric potential as a reference (inverted erasure electric potential) is imparted to the input terminals Vin of the SRAMs 116 when the erasure electric potential is imparted to the output terminals Vout of the SRAMs 116.

The micromirrors are inclined in a direction such that light from the light source is irradiated to the light absorber when the erasure electric potential and the inverted erasure electric potential are imparted to the output terminal Vout and to the input terminal Vin of the SRAM 116, respectively, and the pixels perform black display.

The erasure transistors 115b of all of the lines of pixels are then selected in order, and all perform black display. The erasure period Te1 is complete when all of the erasure scanning lines 117b are selected.

On the other hand, the write in period Ta2 begins either before or after the erasure period Te1 is complete, and the second bit of the digital video signal is written to the pixels, and the angles of the micromirrors 104 are selected.

The display periods Tr1 and Tr2 for performing actual display differ for each line of pixels in accordance with the first bit and the second bit of the digital video signal. The display periods Tr1 and Tr2 are periods from when the switching transistors 115a are selected until the erasure transistors 115b of the same pixels are then selected. In particular, the display period Tr of the first line of pixels is the same as the period from when the write in period Ta begins until the erasure period Te to next appear begins.

The non-display periods Td1 and Td2 for performing black display of all pixels also differ with each line of pixels. The non-display periods Td are periods from the selection of the erasure transistors 115b until the switching transistors 115a are next selected. In particular, the non-display period Td of the first line of pixels is the same as the period from when the erasure period Te begins until the write in period Ta to next appear begins.

The third bit of the digital video signal is then input to the pixels when the write in period Ta3 begins. Then, after the write in period Ta3 is complete, the next write in period Ta4 and not an erasure period begins. The fourth bit of the digital video signal is input to the pixels when the write in period Ta4 begins.

The display periods Tr3 and Tr4 thus appear in succession, as stated above. Note that the display periods Tr for performing actual display differ for each line of pixels in accordance with each bit of the digital video signal. The display periods Tr3 and Tr4 are periods from when the switching transistors 115a are selected until the same switching transistors 115a are again selected. In particular, the display period Tr of the first line of pixels is the same as a period from when the write in period Ta begins until the write in period Ta to next appear begins.

One image can be displayed when all of the display periods Tr1 to Tr4 are complete.

Note that the first write in period Ta1 of the next frame period begins when one frame period is complete or the same time as the display period Tr4 is completed, and that the above operations are then repeated.

It is necessary that the lengths of the display periods be set such that $Tr1:Tr2:Tr3:Tr4=2^0:2^1:2^2:2^3$. The desired gray scale display, from among $2^4$ gray scales, can be performed by combining these display periods.

The gray scale displayed in a pixel during one frame period is set in accordance with finding the total sum of the lengths of the display periods in which light is irradiated to the screen within one frame period. For example, if light irradiated to the screen in all of the display periods is taken as the pixels displaying a brightness of 100 for the case of embodiment 3, then a gray scale of 20 can be expressed when light is irradiated to the screen only during Tr1 and Tr2. If light is irradiated to the screen only during Tr3, then a gray scale of 27 can be expressed in the pixel.

It is essential that the write in periods Ta3 and Ta4 for writing the third bit and the fourth bit of the digital video signal into the pixels have lengths which are shorter than the length of the display periods Tr3 and Tr4, respectively.

Furthermore, the display periods Tr1 to Tr4 may appear in any order. For example, it is possible for the display periods to appear in an order in which Tr3, Tr4, and Tr2 follow Tr1 in one frame period. Note that it is important that the erasure periods Te1 to Te4 must all be chosen such that they do not mutually overlap. Further, it is also very important that an order is chosen such that the display periods Tr1 to Tr4 do not mutually overlap.

It becomes possible to make the length of the display period corresponding to a conventional subframe period shorter with the DMD time division gray scale display of the present invention, in comparison with conventional DMD time division gray scale display. Consequently, it becomes possible to make the number of image gray scales very high even if the write in speed of the digital video signal to the pixels is the same as the conventional.

Note that it is possible to implement embodiment 3 in combination with embodiment 2.

[Embodiment 4]

Figure 11:
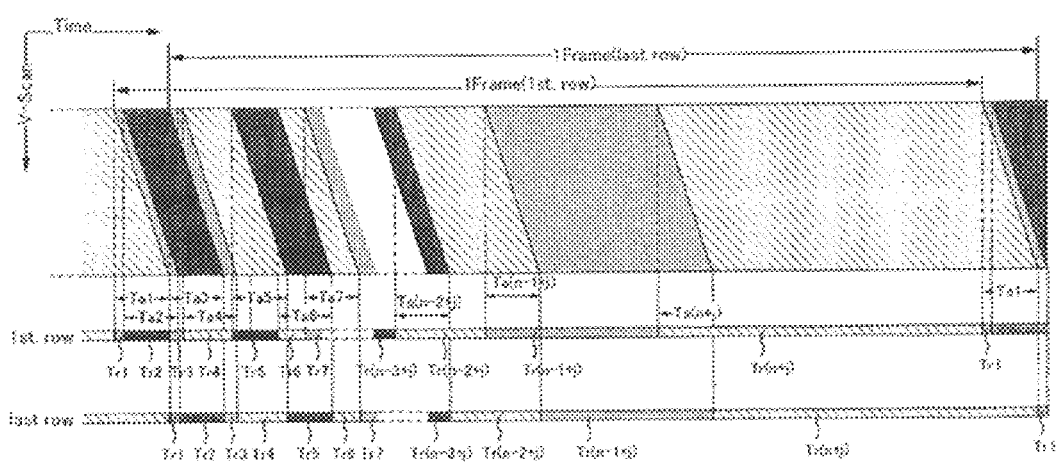
FIG. 11 is a diagram showing a method of driving a second structure DMD of the present invention.

A method of driving in which non-display periods for performing black display in all pixels are formed in the second structure DMD of the present invention is explained in embodiment 4 using FIG. 11. Note that the DMD of embodiment 4 has the structure shown in FIG. 5 and in FIGS. 7A and 7B. The horizontal axis shows a time scale in FIG. 11, while the vertical axis shows the position of a scanning line.

First, the first bit of a digital video signal is input to each pixel in the write in period Ta1. Note that the input to the pixels of the digital video signal in embodiment 4 is performed similarly to that of the embodiment mode, and therefore an explanation of the detailed driving mechanism is omitted here.

If the digital video signal and the inverted digital video signal are input to the first address electrodes 102a and to the second address electrodes 102b, then the angles of the micromirrors of the pixels, with respect to the substrate, are selected in accordance with the "1" or "0" information in the digital video signal. Whether light from a light source is irradiated to a screen, or whether the light from the light source is irradiated to a light absorber, is selected when the angle with respect to the substrate is selected.

The write in period Ta2 begins next, before the write in period Ta1 is complete. A digital signal (non-display signal) having information such that black display is performed in all of the pixels is input to each pixel in the write in period Ta2 in embodiment 4. Differing from the digital video signal, the non-display signal does not have image information.

Note that the digital video signal having image information, the inverted digital video signal having image information, and the non-display signal which does not have image information are all included in the term digital signal in this specification.

All of the pixels are placed in a black display state when the non-display signal is input to each pixel. Display of an image therefore does not occur in the display period Tr2. A period in which the pixels are placed in a state of black display in accordance with the non-display signal having no image information is referred to as a non-display period in this specification. The display period Tr2 is a non-display period in embodiment 4.

Next, the write in period Ta3 begins either before or after the write in period Ta2 is complete. The write in period Ta3 begins before the write in period Ta2 is complete in embodiment 4. The second bit of the digital video signal is input to each pixel in the write in period Ta3.

The display period Tr2, a non-display period, is completed and the display period Tr3 begins, when the second bit of the digital video signal is input to each pixel.

The above operations are repeated until the number n bit of the digital video signal is input to the pixels and all of the display periods (including non-display periods) have appeared.

One frame period is complete when all of the display periods are completed, and one image can be displayed. If the number of non-display periods having been appeared is taken as j, then (n+j) display periods appear within one frame period.

The first bit of the digital video signal is again input to the pixels after the first frame period is complete, and the display period Tr1 begins. The above operations are then repeated.

The display periods Tr1, Tr2, . . . , Tr(n+j−1), and Tr(n+j) are periods from when the write in periods Ta1, Ta2, . . . , Ta(n+j−1), and Ta(n+j) begin, respectively, until the next write in periods to appear Ta2, Ta3, . . . , Ta(n+j), and Ta1 begin.

Further, from among the display periods Tr1 to Tr(n+j), the ratio of the lengths of the display periods becomes $2^0:2^1:2^2: \ldots :2^{(n-2)}:2^{(n-1)}$, when the display periods which are not non-display periods are lined up in order from the shortest.

By combining the display periods which are not non-display periods, the desired gray scale display from among the $2^n$ gray scales can be performed. The gray scale displayed by a pixel within one frame period is determined by finding the total sum of the lengths of the display periods for performing white display in one frame period. Note that, in embodiment 4, the brightness of a pixel becomes 100 when white display is performed in all of the display periods which are not non-display periods.

If the display period which is the longest non-display period within one frame period is formed at the end of the frame period in the driving method of embodiment 4, then it becomes visible to a viewer that there is a cutoff of the frame period between the longest non-display period and the display period which appears next. Display irregularities, which occur due to adjoining display periods in neighboring frame periods when performing an intermediate gray scale display, can thus be made more difficult to recognize in the viewer's eyes.

Further, it is very important to set the lengths of the non-display periods such that an arbitrary write in period does not mutually overlap with its two adjacent write in periods. For example, it is necessary that a write in period Tai does not overlap with a write in period Ta(i+2) and does not overlap with a write in period Ta(i−2).

When adjacent write in periods overlap, it is necessary to write in the digital signal by selecting a first scanning line in one of the adjacent write in periods, and selecting a second scanning line in the other of the write in periods. However, there are no such limitations for cases in which adjacent write in periods do not overlap, and the first scanning lines may be selected in both write in periods, and the second scanning lines may be selected in both write in periods.

It becomes possible with the present invention to perform write in of an arbitrary digital video signal, and the next digital video signal, to the pixels in parallel in accordance with the above stated method of driving. It also becomes possible to make the length of the display period shorter than the period for performing write in of the digital video signal to all of the pixels.

In other words, it becomes possible to make the length of the display period corresponding to a conventional subframe period shorter with the DMD time division gray scale display of the present invention, in comparison with the conventional DMD time division gray scale display. Consequently, it becomes possible to make the number of image gray scales very high even if the write in speed of the digital video signal to the pixels is the same as that of the conventional.

[Embodiment 5]

Figure 12:
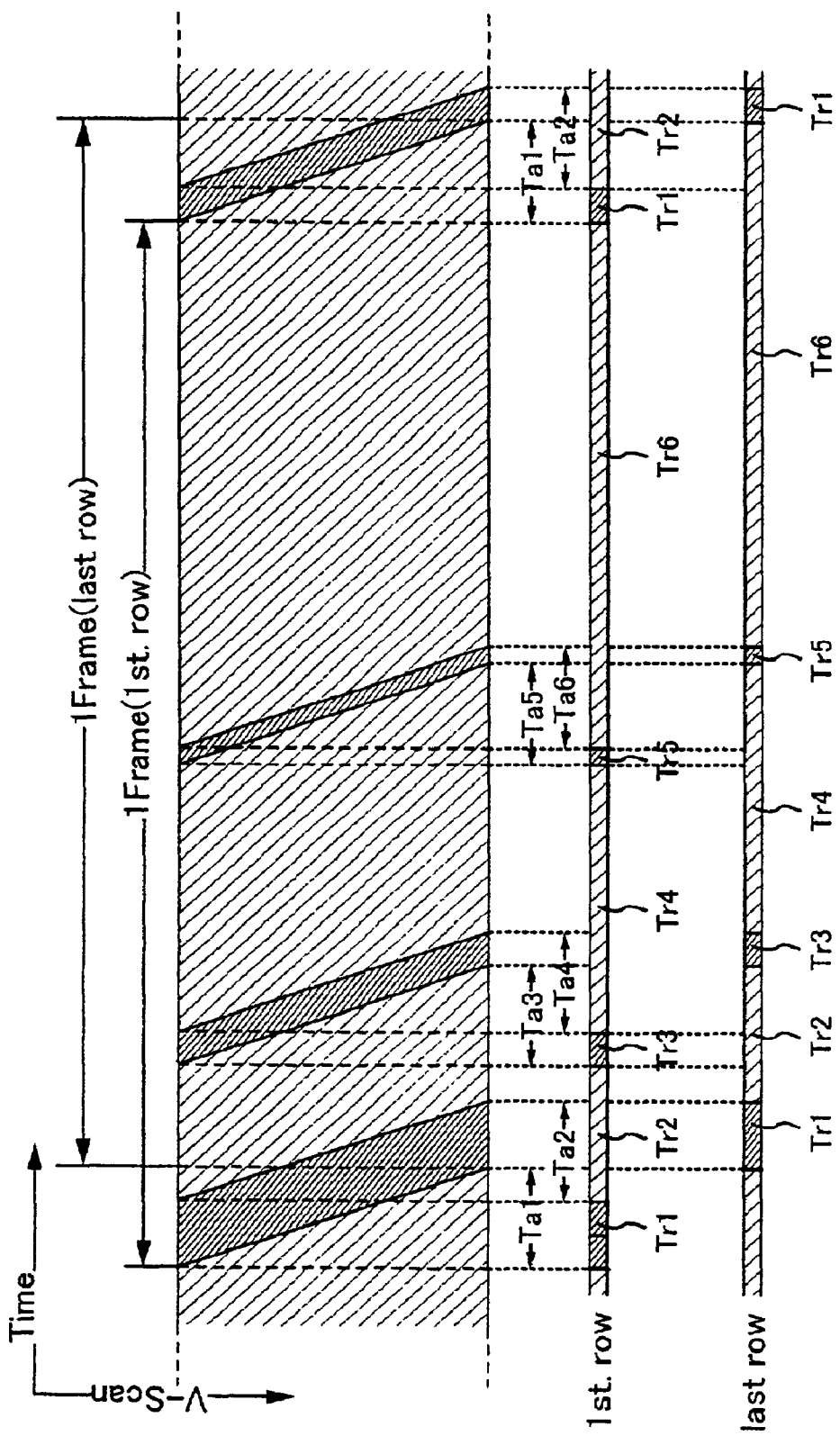
FIG. 12 is a diagram showing the method of driving a second structure DMD of the present invention.

A method of driving in which display is performed in accordance with a 6 bit digital video signal in the second structure DMD of the present invention is explained in embodiment 5 using FIG. 12. Note that the DMD of embodiment 5 has the structure shown in FIG. 5 and in FIGS. 7A and 7B. The horizontal axis shows a time scale in FIG. 12, while the vertical axis shows the position of a scanning line.

The write in period Ta1 begins in the DMD shown in FIG. 5, and the first bit of the digital video signal is input to each pixel. Note that the input to the pixels of the digital video signal in embodiment 5 is performed similarly to that of the embodiment mode, and therefore an explanation of the detailed driving mechanism is omitted here.

If the digital video signal and the inverted digital video signal are input to the first address electrodes 102a and to the second address electrodes 102b, respectively, then the angles of the micromirrors of the pixels, with respect to the substrate, are selected in accordance with the "1" or "0" information in the digital video signal. Whether light from a light source is irradiated to a screen, or whether the light from the light source is irradiated to a light absorber, is selected when the angle with respect to the substrate is selected.

On the other hand, the write in period Ta2 begins either before or after the write in period Ta1 is complete, and the second bit of the digital video signal is input to the pixels. The angles of the micromirrors of all of the pixels are then selected, and display is performed.

A period until the second bit of the digital video signal is input to all of the pixels is the write in period Ta2.

The above operations are repeated until the sixth bit of the digital video signal is input to the pixels. Note that the display periods Tr for performing actual display differ for each line of pixels in accordance with each bit of the digital video signal. The display periods Tr1 to Tr6 are periods from when the digital video signal is input to each line of pixels, until the next bit of the digital video signal is input to the same pixels. In particular, an arbitrary display period Tr of the first line of pixels is the same as a period from when an arbitrary write in period begins until the write in period to next appear begins.

One image can be displayed when all of the display periods Tr1 to Tr6 are complete. A period in which one image is displayed is referred to as one frame period F in the present invention. Note that the frame period F differs for each line of pixels in the driving method of the present invention. The frame period of the final line of pixels begins when a time nearly as long as the write in period Ta1 is passed, after the frame period of the first line of pixels begins.

Note that the first write in period Ta1 of the next frame period begins at the same time as the display period Tr6 is completed, and that the above operations are repeated again.

It is very important that the ratio of the lengths of the display periods be set such that they become $2^0:2^1:2^2: \ldots : 2^4:2^5$ when the display periods Tr are lined up in order from the shortest. The desired gray scale display, from among $2^6$ gray scales, can be performed by combining these display periods.

The gray scale displayed in a pixel during one frame period is set in accordance with finding the total sum of the lengths of the display periods in which light is irradiated to the screen within one frame period. For example, if light irradiated to the screen in all of the display periods is taken as the pixels displaying a brightness of 100, then a gray scale of 19 can be expressed when light is irradiated to the screen only during the display periods corresponding to length ratios of $2^0$ and $2^1$. If light is irradiated to the screen only during the display periods corresponding to length ratios of $2^2$, $2^4$, and $2^5$, then a gray scale of 56 can be expressed in the pixel.

In addition, it is essential that an arbitrary write in period does not mutually overlap with its two neighboring write in periods. For example, it is necessary that a write in period Tai does not overlap with a write in period Ta(i+2) and does not overlap with a write in period Ta(i−2).

Furthermore, although the first scanning line 147a and the second scanning line 147b are selected in order in write in periods appearing in succession in embodiment 5, it is not necessary to limit the present invention to this structure. For cases in which adjacent write in periods overlap, it is necessary to perform write in of the digital signal by selecting the first scanning line in one of the adjacent write in periods, and selecting the second scanning line in the other write in period. However, there is no such limitation for cases in which neighboring write in periods do not overlap, and the first scanning lines may be selected in both of the write in periods, and the second scanning lines may also be selected in both of the write in periods.

It becomes possible with the present invention to perform write in of an arbitrary digital video signal, and the next digital video signal, to the pixels in parallel in accordance with the above stated method of driving. It also becomes possible to make the length of the display period shorter than the period for performing write in of the digital video signal to all of the pixels.

In other words, it becomes possible to make the length of the display period corresponding to a conventional subframe period shorter with the DMD time division gray scale display of the present invention, in comparison with the conventional DMD time division gray scale display. Consequently, it becomes possible to make the number of image gray scales very high even if the write in speed of the digital video signal to the pixels is the same as that of the conventional.

[Embodiment 6]

Figure 13:
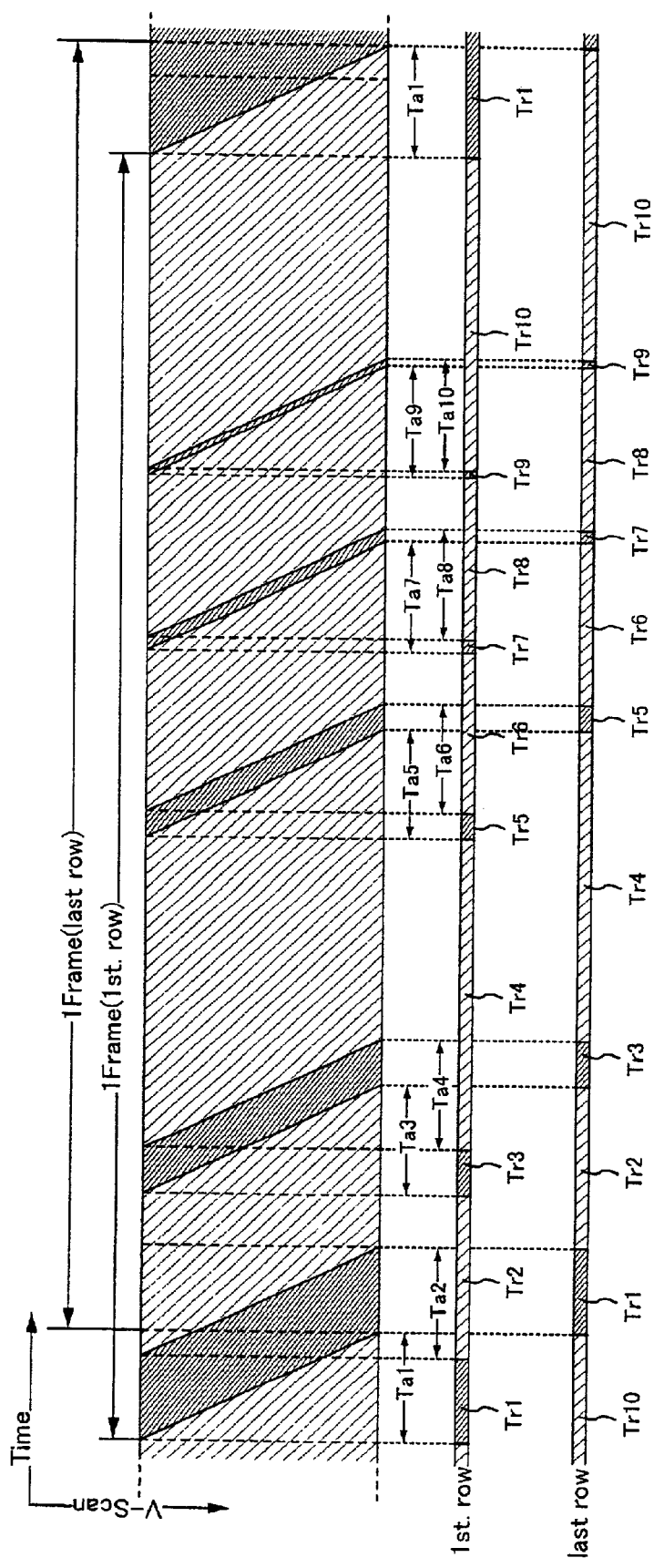
FIG. 13 is a diagram showing the method of driving a second structure DMD of the present invention.

A method of driving in which display of $2^8$ gray scales is performed in accordance with an 8 bit digital video signal, using 10 display periods, in the second structure DMD of the present invention is explained in embodiment 6. Note that the DMD of embodiment 6 has the structure shown in FIG. 5 and in FIGS. 7A and 7B. The horizontal axis shows a time scale in FIG. 13, while the vertical axis shows the position of a scanning line.

The write in period Ta1 begins in the DMD shown in FIG. 5, and the first bit of the digital video signal is input to each pixel. Note that the input to the pixels of the digital video signal in embodiment 6 is performed similarly to that of the embodiment mode, and therefore an explanation of the detailed driving mechanism is omitted here.

If the digital video signal and the inverted digital video signal are input to the first address electrodes 102a and to the second address electrodes 102b, then the angles of the micromirrors of the pixels, with respect to the substrate, are selected in accordance with the "1" or "0" information in the digital video signal. Whether light from a light source is irradiated to a screen, or whether the light from the light source is irradiated to a light absorber, is selected when the angle with respect to the substrate is selected.

On the other hand, the write in period Ta2 begins either before or after the write in period Ta1 is complete, and the second bit of the digital video signal is input to the pixels. The angles of the micromirrors of all of the pixels are then selected, and display is performed.

A period until the second bit of the digital video signal is input to all of the pixels is the write in period Ta2.

The above operations are repeated until the eighth bit of the digital video signal is input to the pixels. Note that the display periods Tr for performing actual display differ for each line of pixels in accordance with each bit of the digital video signal. The display periods Tr1 to Tr10 are periods from when the digital video signal is input to each line of pixels, until the next bit of the digital video signal is input to the same pixels. In particular, an arbitrary display period Tr of the first line of pixels is the same as a period from when an arbitrary write in period begins until the write in period to next appear begins.

One image can be displayed when all of the display periods Tr1 to Tr10 are complete. A period in which one image is displayed is referred to as one frame period F in the present invention. Note that the frame period F differs for each line of pixels in the driving method of the present invention. The frame period of the final line of pixels begins when a time nearly as long as the write in period Ta1 is passed, after the frame period of the first line of pixels begins.

Note that the first write in period Ta1 of the next frame period begins at the same time as the display period Tr10 is completed, and that the above operations are repeated again.

Note that, the same bit of the digital video signal are input to the pixels in the write in periods Ta6, Ta8, and Ta10 in embodiment 6. The sixth bit of the digital video signal is input to the pixels in the write in periods Ta6, Ta8, and Ta10 in embodiment 6.

Further, the ratio of lengths of the display periods Tr1 to tr10 are set in embodiment 6 such that $Tr9:Tr7:Tr5:Tr3:Tr1:Tr2:Tr4:(Tr6+Tr8+Tr10) = 2^0:2^1:2^2:2^3:2^4:2^5:2^6:2^7$. Note that the length ratios of the display periods are not limited to this order. The length ratios may be set so as to become $2^0:2^1:\ldots:2^4:2^7$ for a case in which the display periods Tr1 to Trn are arranged in order from the shortest.

The three display periods Tr6, Tr8, and Tr10 function as one display period in embodiment 6, and $2^8$ gray scales of display are therefore performed. It is possible to perform display of a desired gray scale by combining the display periods Tr1 to Tr10, from among $2^8$ gray scales.

The gray scale displayed in a pixel during one frame period is set in accordance with finding the total sum of the lengths of the display periods in which light is irradiated to the screen within one frame period. For example, if light irradiated to the screen in all of the display periods is taken as the pixels displaying a brightness of 100, then a gray scale of 19 can be expressed when light is irradiated to the screen only during the display periods corresponding to length ratios of $2^0$ and $2^1$. If light is irradiated to the screen only during the display periods corresponding to length ratios of $2^2, 2^4, 2^5, 2^7$, and $2^9$, then a gray scale of 55 can be expressed in the pixel.

In addition, it is essential that an arbitrary write in period does not mutually overlap with its two neighboring write in periods. For example, it is necessary that a write in period Tai does not overlap with a write in period Ta(i+2) and does not overlap with a write in period Ta(i−2).

Furthermore, although the first scanning line 147a and the second scanning line 147b are selected in order in write in periods appearing in succession in embodiment 6, it is not necessary to limit the present invention to this structure. For cases in which adjacent write in periods overlap, it is necessary to perform write in of the digital signal by selecting the first scanning line in one of the adjacent write in periods, and selecting the second scanning line in the other write in period. However, there is no such limitation for cases in which neighboring write in periods do not overlap, and the first scanning lines may be selected in both of the write in periods, and the second scanning lines may also be selected in both of the write in periods.

It becomes possible with the present invention to perform write in of an arbitrary digital video signal, and the next digital video signal, to the pixels in parallel in accordance with the above stated method of driving. It also becomes possible to make the length of the display period shorter than the period for performing write in of the digital video signal to all of the pixels.

[Embodiment 7]

Figure 14:
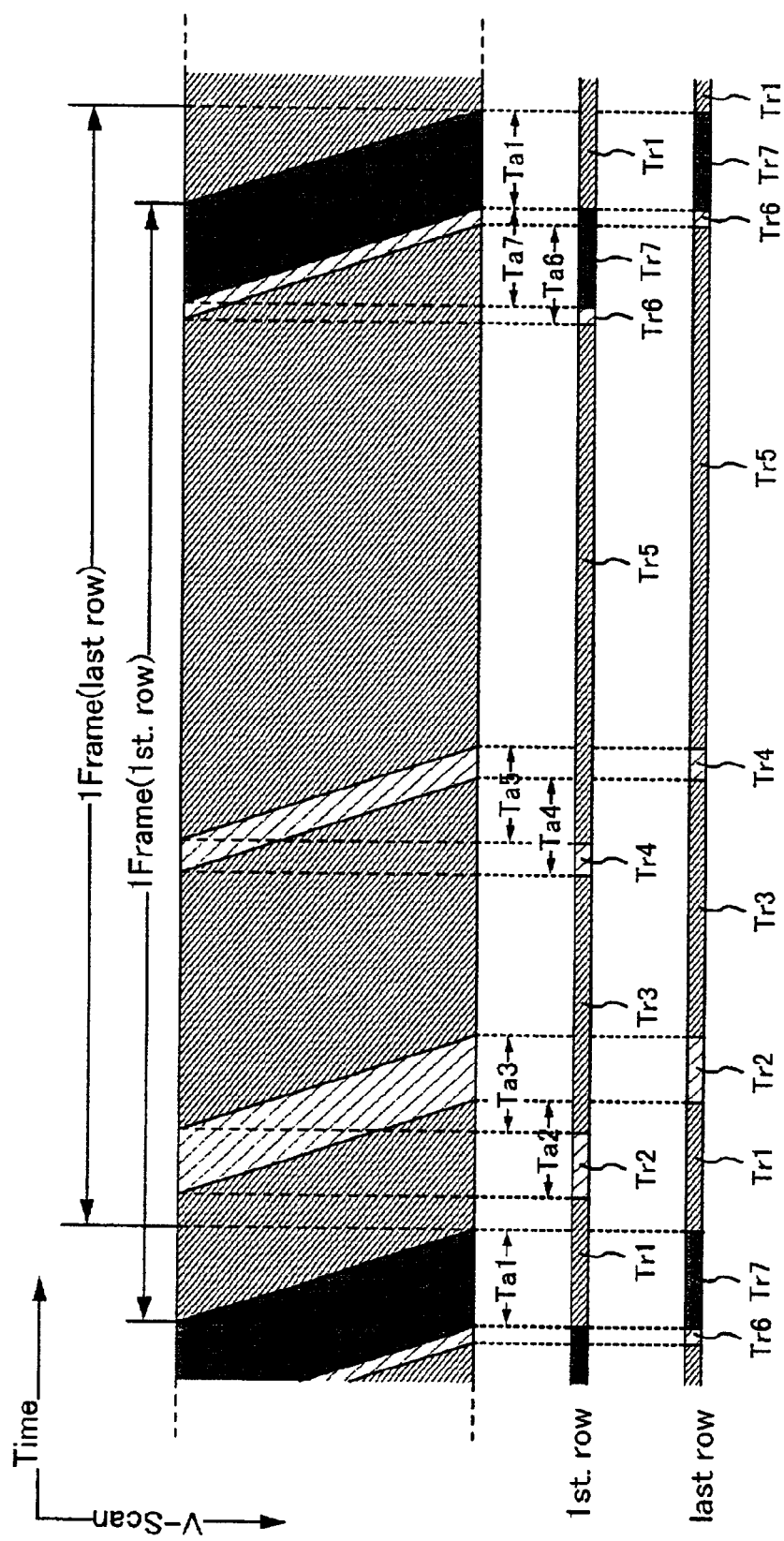
FIG. 14 is a diagram showing the method of driving a second structure DMD of the present invention.

A method of driving in which display of $2^6$ gray scales is performed in accordance with an 6 bit digital video signal, using 7 display periods, in the second structure DMD of the present invention is explained in embodiment 7. Note that the DMD of embodiment 7 has the structure shown in FIG. 5 and in FIGS. 7A and 7B. The horizontal axis shows a time scale in FIG. 14, while the vertical axis shows the position of a scanning line.

First, in the write in period Ta1 the first bit of the digital video signal is input to each pixel. Note that the input to the pixels of the digital video signal in embodiment 7 is performed similarly to that of the embodiment mode, and therefore an explanation of the detailed driving mechanism is omitted here.

If the digital video signal and the inverted digital video signal are input to the first address electrodes 102a and to the second address electrodes 102b, then the angles of the micromirrors of the pixels, with respect to the substrate, are selected in accordance with the "1" or "0" information in the digital video signal. Whether light from a light source is irradiated to a screen, or whether the light from the light source is irradiated to a light absorber, is selected when the angle with respect to the substrate is selected.

On the other hand, the write in period Ta2 either begins before or after the write in period Ta1 is complete, and the second bit of the digital video signal is input to the pixels. The angles of the micromirrors of all of the pixels are then selected, and display is performed.

A period until the second bit of the digital video signal is input to all of the pixels is the display period Ta2. When the second bit of the digital video signal is input to the pixels, then display is performed in each pixel.

The above operations are repeated until the sixth bit of the digital video signal is input to the pixels. Note that the display periods Tr for performing actual display differ for each line of pixels in accordance with each bit of the digital video signal. The display periods Tr1 to Tr6 are periods from when the digital video signal is input to each line of pixels, until the next bit of the digital video signal is input to the same pixels. In particular, an arbitrary display period Tr of the first line of pixels is the same as a period from when an arbitrary write in period begins until the write in period to next appear begins.

Next, the write in period Ta7 begins next, before the write in period Ta6 is complete. A digital signal (non-display signal) having information such that black display is performed in all of the pixels is input to each pixel in the write in period Ta7 in embodiment 7. Differing from the digital video signal, the non-display signal does not have image information.

All of the pixels are placed in a black display state when the non-display signal is input to each pixel. Display of the pixels therefore does not occur in the display period Tr7. The display period Tr7 is a non-display period in embodiment 7.

Next, the first write in period of the next frame period, the write in period Ta1, begins either before or after the write in period Ta7 is complete. The display period Tr7 is complete at the same time as Ta1 of the next frame period begins, and one frame period is completed.

One frame period is complete when all of the display periods are complete, and one image can be displayed. The number of non-display periods which appear is one, and therefore 7 display periods appear within one frame period.

After one frame period is complete, the first bit of the digital video signal is again input to the pixels, and the display period Tr1 begins. The above operations are then repeated.

The display periods Tr1, Tr2, ..., Tr6, and Tr7 are periods from when the digital signal is written to the pixels in the write in periods Ta1, Ta2, ..., Ta6, and Ta7, respectively, until the digital signal is again written to the pixels in the write in periods to next appear Ta2, Ta3, ..., Ta(n+j), and Ta1.

Further, from among the display periods Tr1 to Tr7, the ratio of lengths of the display periods becomes $2^0:2^1:2^2:\ldots:2^4:2^5$ for a case in which the display periods Tr1 to Tr6, which are not non-display periods, are arranged in order from the shortest.

By combining the display periods which are not non-display periods, the desired gray scale display from among the $2^6$ gray scales can be performed. The gray scale displayed by a pixel within one frame period is determined by finding the total sum of the lengths of the display periods for performing white display in one frame period. Note that, in embodiment 7, the brightness of a pixel becomes 100 when white display is performed in all of the display periods which are not non-display periods.

For example, if light irradiated to the screen in all of the display periods is taken as the pixels displaying a brightness of 100, then a gray scale of 13 can be expressed in the pixels when light is irradiated to the screen only during the display periods corresponding to length ratios of $2^0$. If light is irradiated to the screen only during the display periods corresponding to length ratios of $2^2$, $2^4$, and $2^5$, then a gray scale of 78 can be expressed in the pixel.

If the display period which is the longest non-display period within one frame period is formed at the end of the frame period in the driving method of embodiment 7, then it becomes visible to a viewer that there is a cutoff of the frame period between the longest non-display period and the display period which appears next. Display irregularities, which occur due to adjoining display periods in neighboring frame periods when performing an intermediate gray scale display, can thus be made more difficult to recognize in the viewer's eyes.

Further, it is very important to set the lengths of the non-display periods such that an arbitrary write in period does not mutually overlap with its two adjacent write in periods. For example, it is necessary that a write in period Tai does not overlap with a write in period Ta(i+2) and does not overlap with a write in period Ta(i−2).

When adjacent write in periods overlap, it is necessary to write in the digital signal by selecting a first scanning line in one of the adjacent write in periods, and selecting a second scanning line in the other of the write in periods. However, there are no such limitations for cases in which adjacent write in periods do not overlap, and the first scanning lines may be selected in both write in periods, and the second scanning lines may be selected in both write in periods.

It becomes possible with the present invention to perform write in of an arbitrary digital video signal, and the next digital video signal, to the pixels in parallel in accordance with the above stated method of driving. It also becomes possible to make the length of the display period shorter than the period for performing write in of the digital video signal to all of the pixels.

In other words, it becomes possible to make the length of the display period corresponding to a conventional subframe period shorter with the DMD time division gray scale display of the present invention, in comparison with the conventional DMD time division gray scale display. Consequently, it becomes possible to make the number of image gray scales very high even if the write in speed of the digital video signal to the pixels is the same as that of the conventional.

[Embodiment 8]

A detailed structure of a pixel of a DMD of the present invention is explained in embodiment 8.

Figure 15:
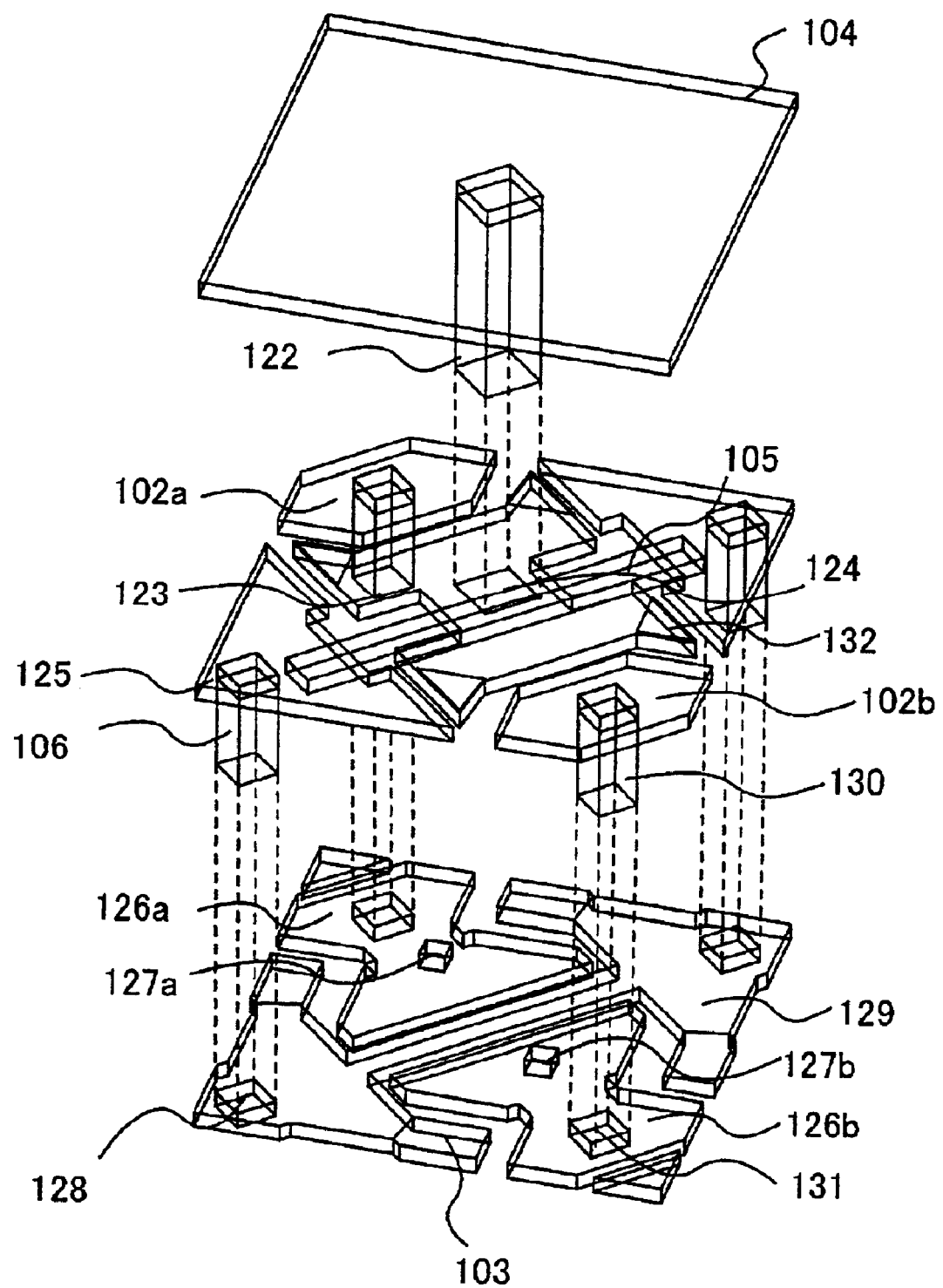
FIG. 15 is a diagram showing a structure of a DMD of the present invention.

An example of a DMD used by the present invention is shown in FIG. 15. Reference numeral 104 denotes the micromirror, and the micromirror 104 is connected to a support post 124 of a yoke 123 by a micromirror support post 122.

The yoke 123 maintains a hinge 105. Further, the hinge 105 is maintained by a post cap 125. The post cap 125 is connected to a hinge support post connection portion 128 of a bias bus 129 by a hinge support post 106. The bias bus 129 has a landing site 103. The landing site 103 has insulating properties, and maintains the same electric potential as that of the micromirror 104.

Reference numeral 102*a* denotes the first address electrode, and reference numeral 102*b* denotes the second address electrode. The first address electrode 102a is connected to an electrode support post connection portion 131 of a first address electrode pad 126a by an electrode support post 130. Further, the second address electrode 102b is also connected to the electrode support post connection portion 131 of a second address electrode pad 126b by the electrode support post 130.

A digital signal input to the first address electrode pad 126a from a first connection portion 127a is input to the first address electrode 102a. A digital signal input to the second address electrode pad 126b from a second connection portion 127b is input to the second address electrode 102b.

The micromirror 104 is inclined in accordance with the digital signal's input to the first address electrode 102a and to the second address electrode 102b, and white display or black display is selected. A portion of a yoke cantilever 132 may also contact the landing site 103 by the inclination of the micromirror 104.

It is possible to implement embodiment 8 by freely combining it with any of embodiments 1 to 7.

[Embodiment 9]

A structure of a SRAM used in the present invention is explained in embodiment 9.

Figure 16:
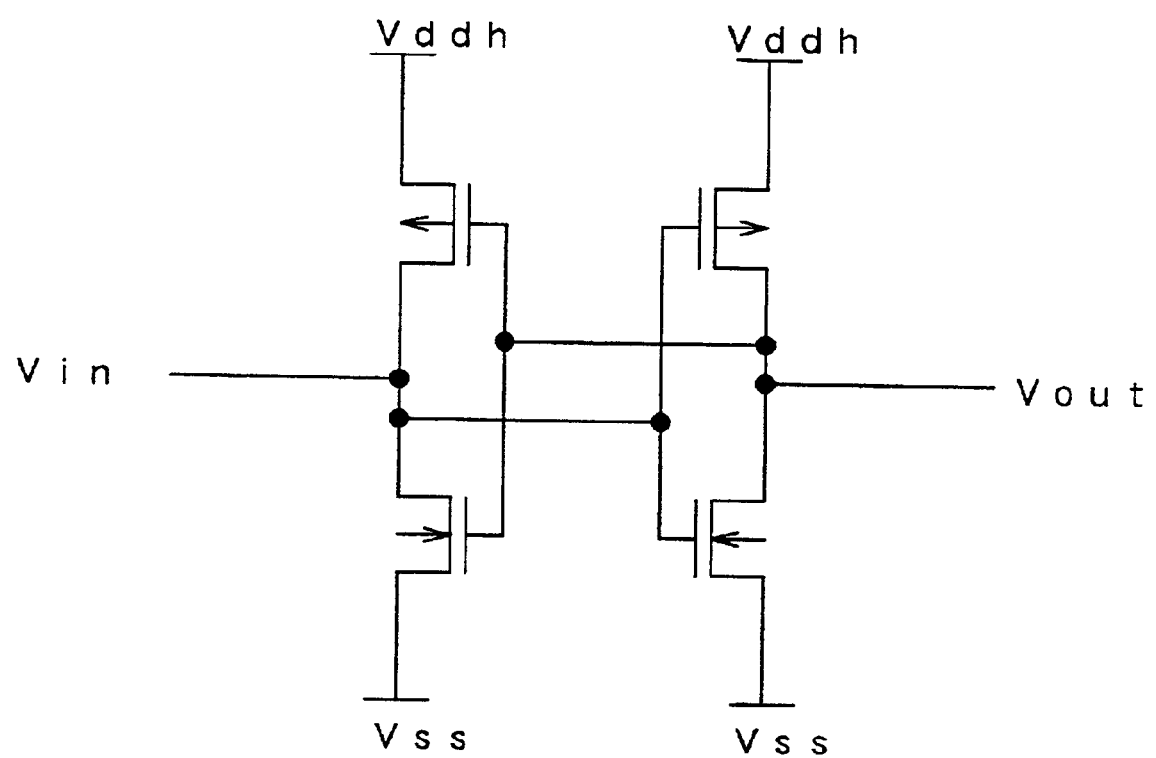
FIG. 16 is an equivalent circuit diagram of a SRAM.

FIG. 16 shows an example of a circuit diagram of a SRAM. The SRAM has two each of p-channel transistors and n-channel transistors. Source regions of each of the p-channel transistors are connected to the high voltage side electric power source Vddh, while source regions of each of the n-channel transistors are connected to the low voltage side electric power source Vss. One p-channel transistor and one n-channel transistor form a pair, and two sets of the p-channel transistor and n-channel transistor pairs exist within one SRAM.

The p-channel transistor and n-channel transistor pair are mutually connected by their drain regions. Further, the p-channel transistor and n-channel transistor pair are also mutually connected by their gate electrodes. The drain regions of one pair of the p-channel and the n-channel transistors are then maintained at the same electric potential as the gate electrodes of the other pair of the p-channel and the n-channel transistors. The drain regions of one pair of the p-channel and the n-channel transistors is connected to the input terminal Vin, and the drain region of the other pair of the p-channel and the n-channel transistors is connected to the output terminal Vout.

The electric potential of Vin and the electric potential of Vout are inverted, with ground as a reference, with the SRAM. In other words, if Vin is HI, then Vout will become a LO signal corresponding to Vss, and if Vin is LO, then Vout will become a HI signal corresponding to Vddh.

A structure of a SRAM used by the present invention and having a structure which differs from that of FIG. 16 is explained next.

Figure 17A:
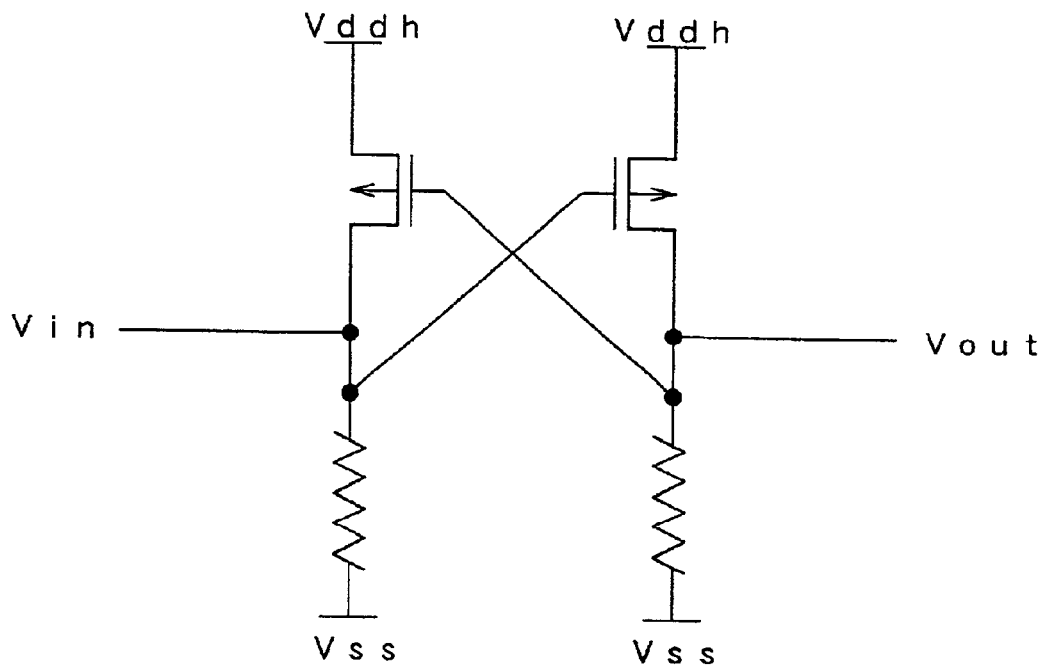
FIGS. 17A and 17B are equivalent circuit diagrams of SRAMs.

FIG. 17A shows an equivalent circuit diagram of a SRAM of embodiment 9. The SRAM has two p-channel transistors and two resistors. One p-channel transistor and one resistor become a pair, and two sets of p-channel transistor and resistor pairs exist within one SRAM. The source region of the p-channel transistor is connected to the high voltage side electric power source Vddh, and the drain region is connected to the low voltage side electric power source Vss through the resistor.

The drain regions of the p-channel transistors are mutually maintained at the same electric potential as the gate electrodes of the other p-channel transistors. The drain region of one of the p-channel transistors is connected to the input terminal Vin, and the drain region of the other p-channel transistor is connected to the output terminal Vout.

The electric potential of Vin and the electric potential of Vout are inverted, with ground as a reference, with the SRAM. In other words, if Vin is HI, then Vout will become a LO signal corresponding to Vss, and if Vin is LO, then Vout will become a HI signal corresponding to Vddh.

It is possible that the SRAM of embodiment 9 form resistors at the same time as the p-channel transistors are formed, and therefore it is not necessary to form any n-channel transistors. The number of process steps can be reduced compared to the SRAM shown by FIG. 16.

Figure 17B:
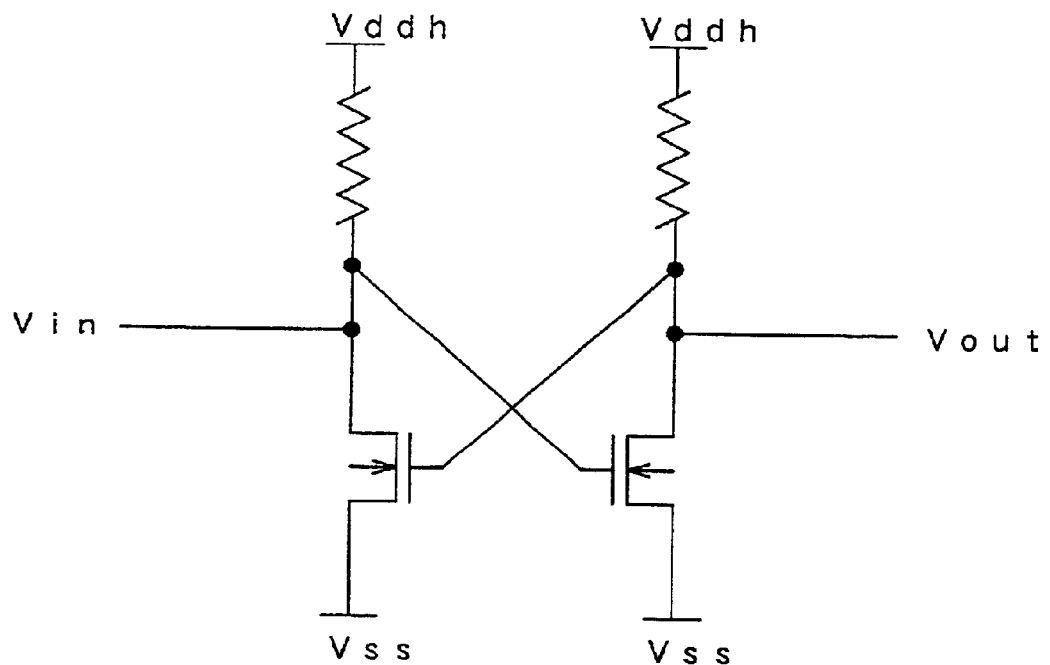

FIG. 17B shows an equivalent circuit diagram of a SRAM of embodiment 9. The RAM has two n-channel transistors and two resistors. One n-channel transistor and one resistor become a pair, and two sets of n-channel transistor and resistor pairs exist within one SRAM. The drain region of the n-channel transistor is connected to the high voltage side electric power source Vddh, and the source region is connected to the low voltage side electric power source Vss through the resistor.

The drain regions of the n-channel transistors are mutually maintained at the same electric potential as the gate electrodes of the other n-channel transistors. The drain region of one of the n-channel transistors is connected to the input terminal Vin, and the drain region of the other n-channel transistor is connected to the output terminal Vout.

The electric potential of Vin and the electric potential of Vout are inverted, with ground as a reference, with the SRAM. In other words, if Vin is HI, then Vout will become a LO signal corresponding to Vss, and if Vin is LO, then Vout will become a HI signal corresponding to Vddh.

It is possible that the SRAM of embodiment 9 forms resistors at the same time as the n-channel transistors are formed, and therefore it is not necessary to form any p-channel transistors. The number of process steps can be reduced compared to the SRAM shown by FIG. 16.

Note that SRAMs capable of being used in the present invention are not limited to those having the above structures. It is possible to use any type of SRAM, provided that it has a structure such that the electric potential of Vin and the electric potential of Vout are inverted, with ground as a reference, It is possible to implement embodiment 9 by freely combining it with any of embodiments 1 to 8.

[Embodiment 10]

A projector (DLP) using a DMD of the present invention is explained in embodiment 10.

Figure 18A:
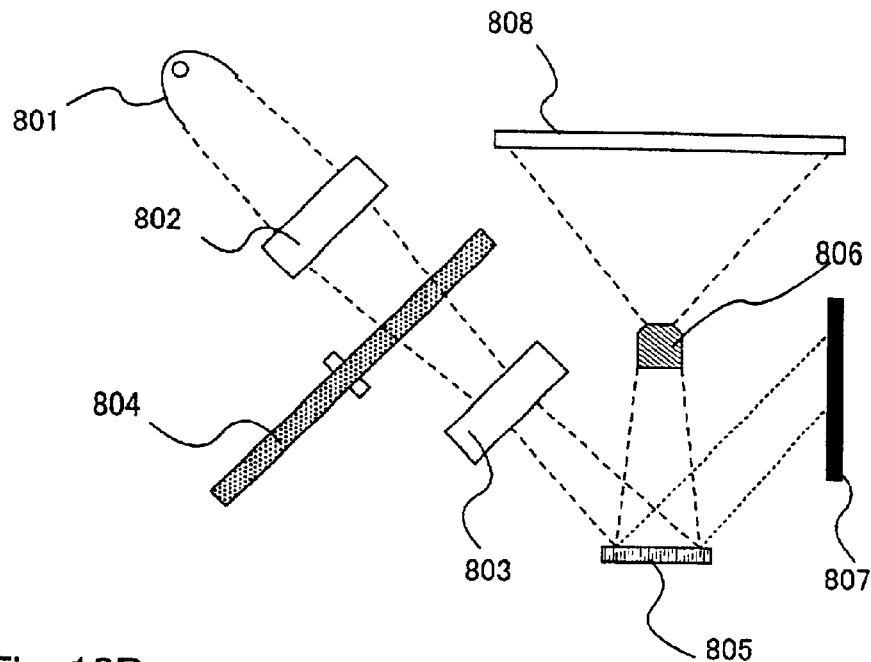
FIGS. 18A to 18C are diagrams of a DLP and a rotating color foil of a DMD of the present invention.

Shown in FIG. 18A is a schematic diagram of a one chip projector using one DMD. A light source 801, condenser lenses 802 and 803, a rotating color foil 804, a DMD 805, a projecting lens 806, a light absorber 807, and a screen 808 are formed as shown in FIG. 18A.

The DMD 805 irradiates light emitted from the light source 801 to the screen 808, or to the light absorber 807, in accordance with the information of an input digital video signal.

Figure 18B:
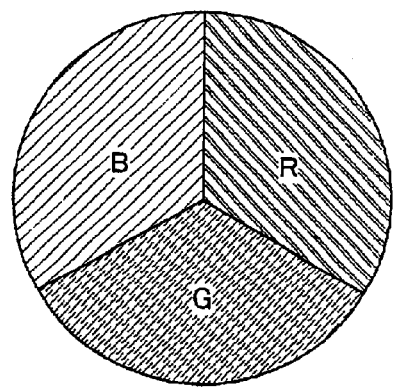

FIG. 18B is a diagram showing a structure of the rotating color foil 804, which has three color filters, R (red), G (green), and B (blue). One color image is formed by projecting R (red) images, G (green) images, and B (blue) images to the screen 808 in succession.

Figure 18C:
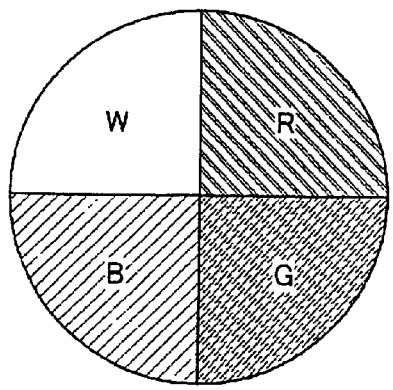

FIG. 18C is a diagram showing a structure of the rotating color foil 804 which differs from that of FIG. 18B. The rotating color foil 804 has color filters in the three colors of R (red), G (green) and B (blue), and also a W (transparent) color filter. One color image is formed by projecting R (red) images, G (green) images, and B (blue) images to the screen 808 in succession. The rotating color foil shown in FIG. 18C differs from the rotating color foil shown in FIG. 18B and it also has the W (transparent) color filter. By forming the transparent color filter, it becomes possible to increase the brightness by approximately 37% over that of the rotating color foil shown in FIG. 18B.

The one chip projector is completed with one DMD chip, and therefore the cost of the DLP can be reduced.

Figure 19A:
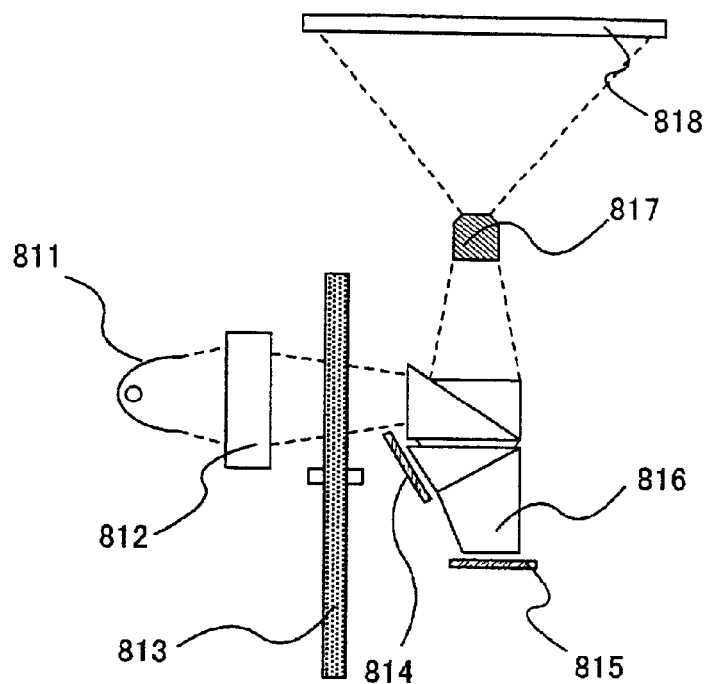
FIGS. 19A and 19B are diagrams of DLPs of a DMD of the present invention.

A schematic diagram of a two chip projector, using two DMDs, is shown next in FIG. 19A. A light source 811, a condenser lens 812, a rotating color foil 813, a red DMD 814, a blue/green DMD 815, a color separating/color combining prism 816, a projecting lens 817, and a screen 818 are provided as shown in FIG. 19A.

Note that, although a light absorber is not shown in FIG. 19A, light absorbers are formed in both the red DMD 814 and in the blue/green DMD 815. The red DMD 814 and the blue/green DMD 815 irradiate light emitted form the light source 811 to the screen 818, or to the light absorbers, in accordance with information contained in an input digital video signal.

The rotating color foil 813 has magenta and yellow color foils.

Light from the light source 811 normally passes through the rotating color foil 813. Red color light from the light which has passed through the rotating color foil 813 is separated out by the color separating/color combing prism 816, and irradiated to the red DMD 814. Light used to form an image from the light reflected in the red color DMD 814 is made incident to the projecting lens 817. Time division gray scale display using one frame period is thus performed for a red color image.

Further, blue color and green color light are each separated by the magenta and yellow color filters, respectively, and are sent to the blue color and green color DMD 815 by the color separating/color combining prism 816. Time division gray scale display using one-half of one frame period is thus performed for each of the colors.

Figure 19B:
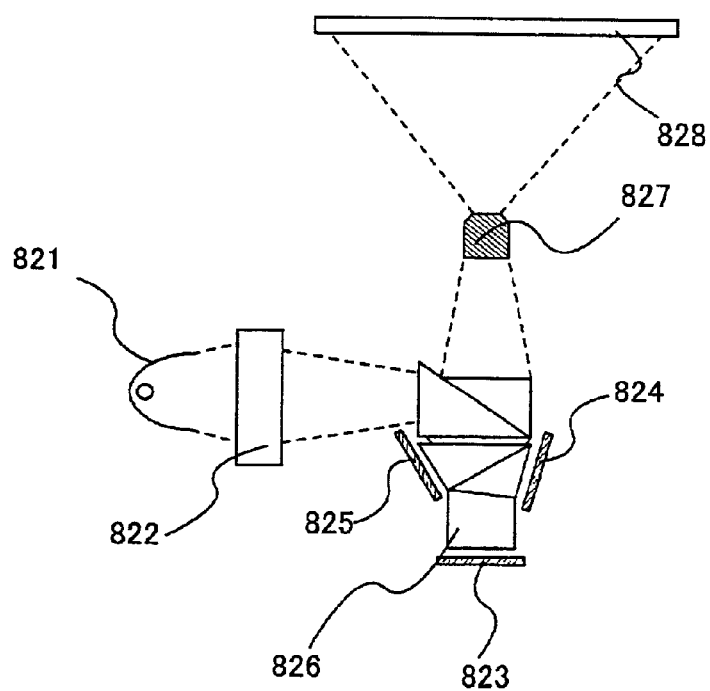
Figure 20A:
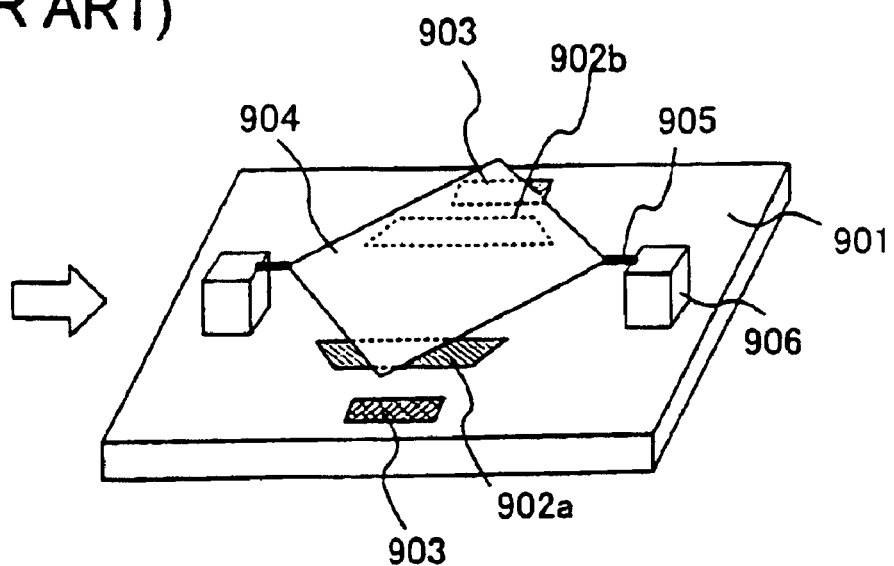
FIGS. 20A and 20B are diagrams showing simply a DMD structure.
Figure 20B:
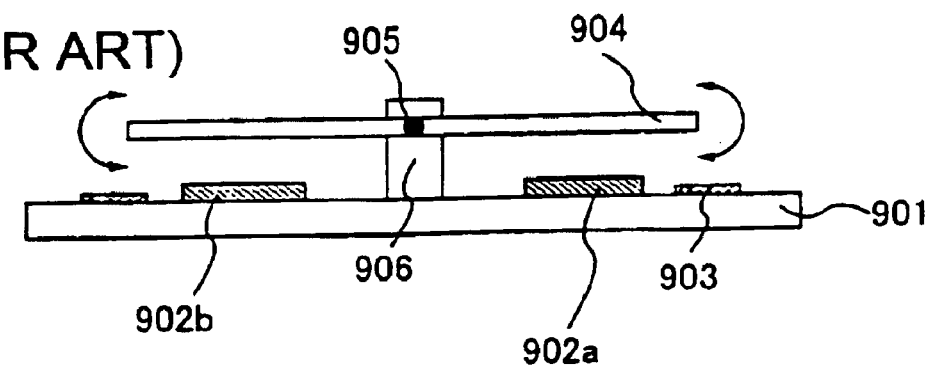
Figure 21:
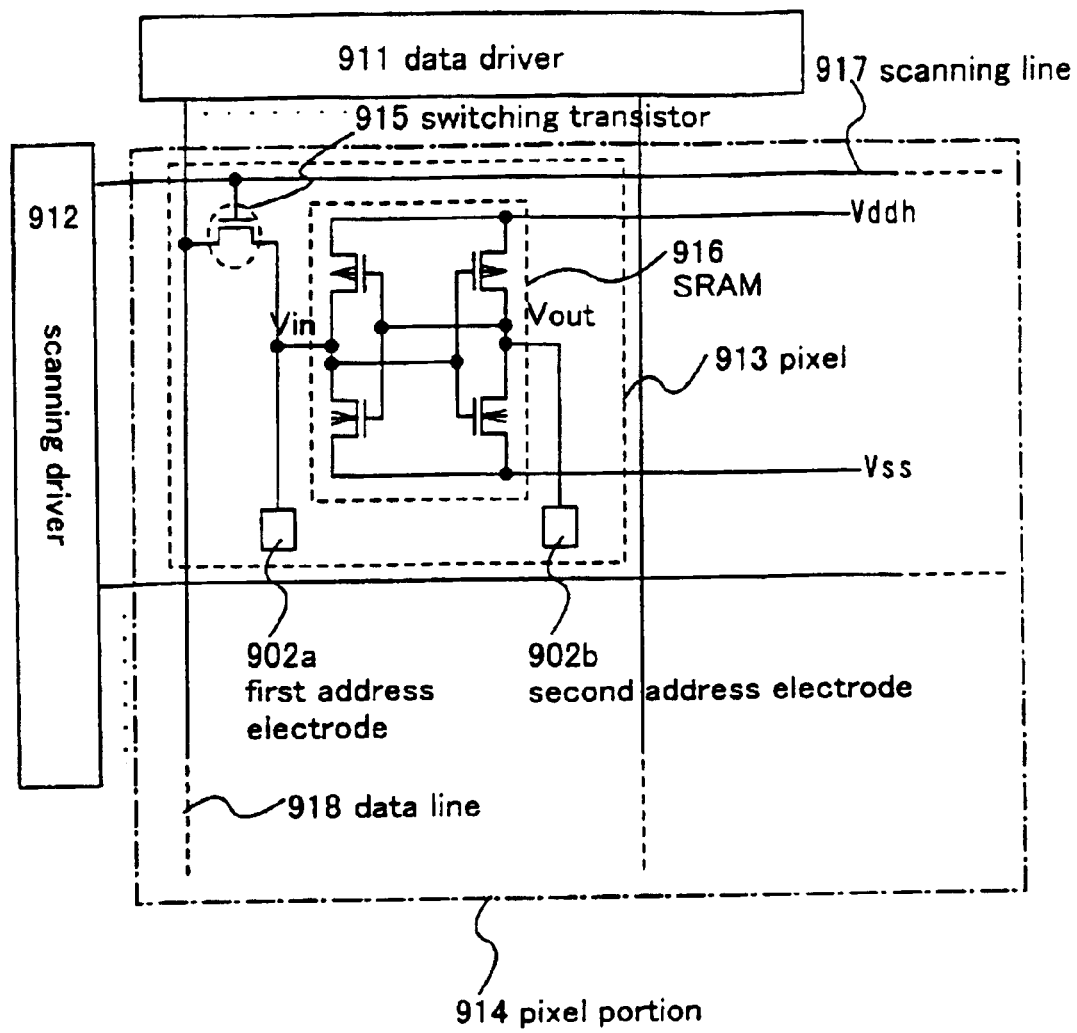
FIG. 21 is a diagram showing a pixel portion and a driver circuit of a conventional DMD.
Figure 22:
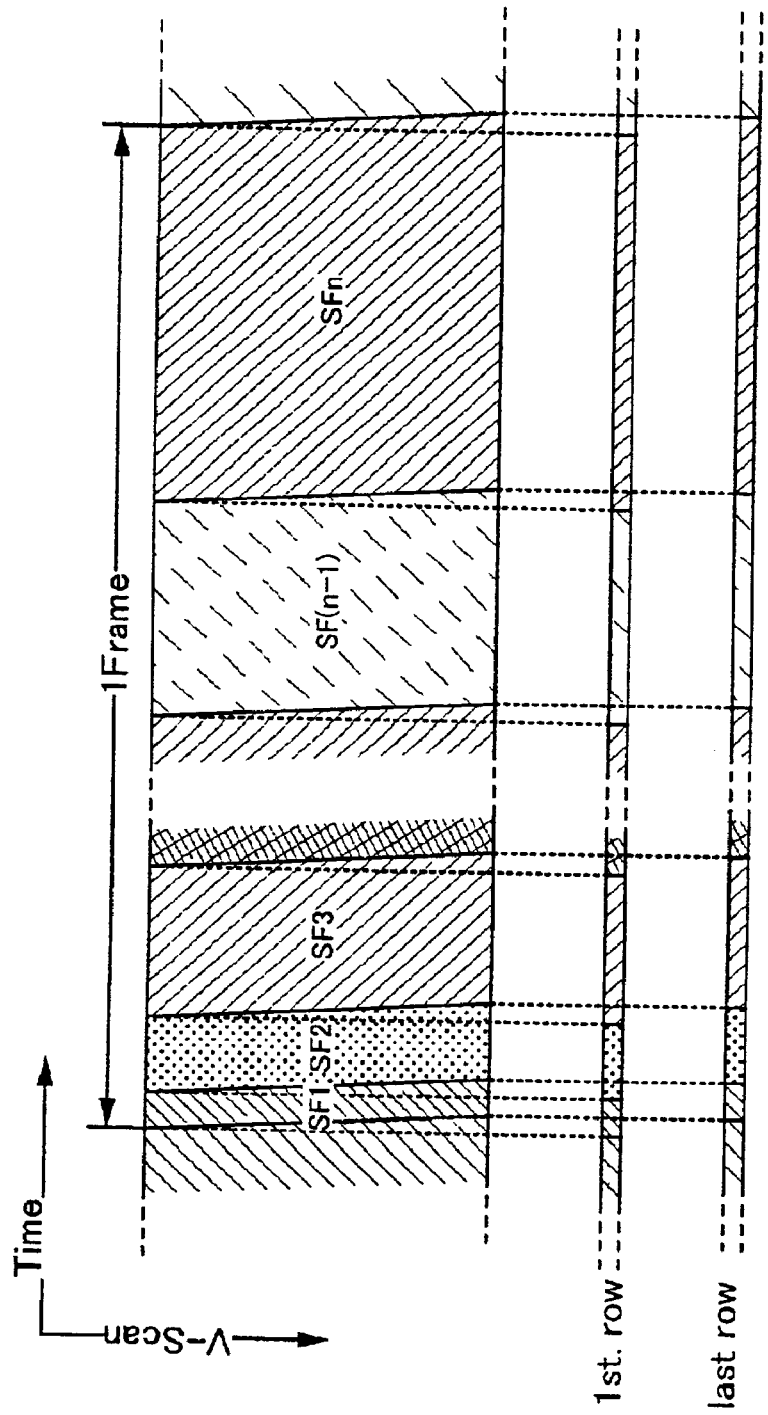
FIG. 22 is a diagram showing simply a conventional method of driving a DMD.
Figure 23:
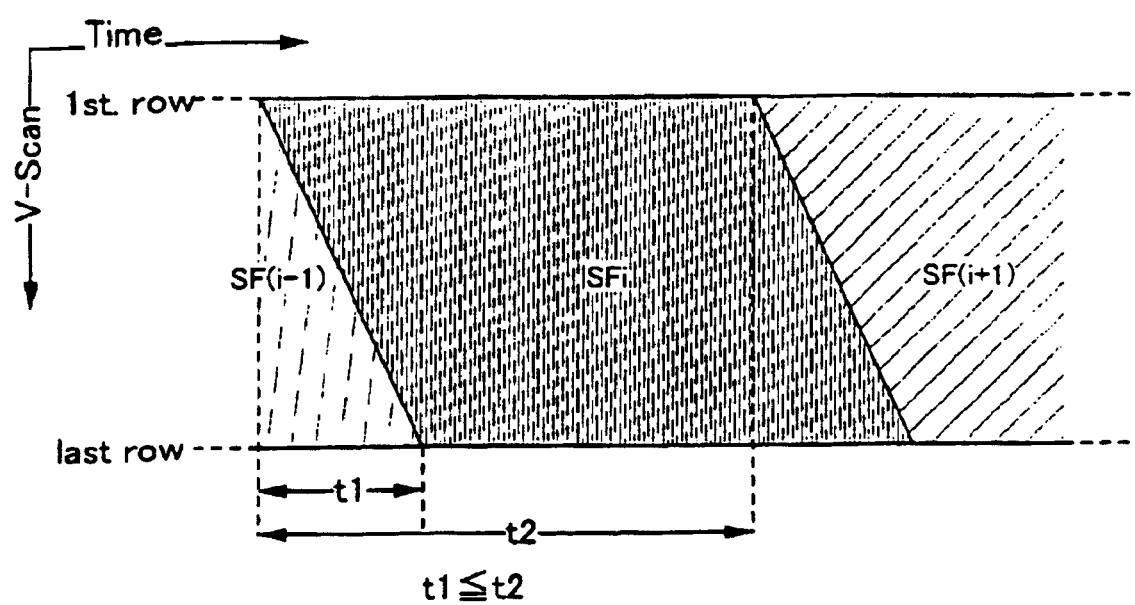
FIG. 23 is a diagram for explaining problem points of a conventional method of driving a DMD.

Next, a schematic diagram of a three chip projector, using three DMDs, is shown in FIG. 19B. A light source 821, a condenser lens 822, a green DMD 823, a red DMD 824, a blue DMD 825, a color separating/color combining prism 826, a projecting lens 827, and a screen 828 are formed as shown in FIG. 19B.

Note that, although a light absorber is not shown in FIG. 19B, light absorbers are formed in the green DMD 823, in the red DMD 824, and in the blue DMD 825, respectively. The green DMD 823, the red DMD 824, and the blue DMD 825 irradiate light emitted form the light source 821 to the screen 828, or to the light absorbers, in accordance with information contained in an input digital video signal.

The light from the light source 821 is reflected by DMDs specialized for RGB, undergoes an additive color process by the projecting lens, and is then displayed as a color image for the case of the three chip projector. This type of projector has high image quality and high efficiency, and is mainly used in high end projectors.

Note that it is possible to use the DMD of the present invention in other electronic devices, such as a printer and a photocopier, in addition to a projector.

It is possible to implement embodiment 10 by freely combining it with any of embodiments 1 to 9.

It becomes possible to make the length of the display period corresponding to a conventional subframe period shorter with the DMD time division gray scale display of the present invention, in comparison with the conventional DMD time division gray scale display. Consequently, it becomes possible to make the number of image gray scales very high even if the write in speed of the digital video signal to the pixels is the same as that of the conventional.

What is claimed is:

1. A digital micromirror device comprising:

a first electrode and a second electrode;

a micromirror located over said first electrode and said second electrode;

a first switching element;

a second switching element; and a SRAM electrically connected to the first and second switching elements and including transistors distinct from the first and second switching elements, wherein:

an output of said first switching element is connected to said first electrode;

an output of said second switching element is connected to said second electrode;

an input of said SRAM is connected to said first electrode;

an output of said SRAM is connected to said second electrode; and the voltages of the input and the output of said SRAM mutually differ.

2. A digital micromirror device comprising:

a micromirror;

a first electrode and a second electrode for changing the inclination of the micromirror;

a first switching element;

a second switching element; and a SRAM electrically connected to the first and second switching elements and including transistors distinct from the first and second switching elements, wherein:

an output of said first switching element is connected to said first electrode;

an output of said second switching element is connected to said second electrode;

an input of said SRAM is connected to said first electrode;

an output of said SRAM is connected to said second electrode; and voltages of the input and the output of said SRAM mutually differ.

3. A digital micromirror device comprising:

a micromirror;

a first electrode and a second electrode for changing the inclination of said micromirror;

a first switching element;

a second switching element; and a SRAM electrically connected to the first and second switching elements and including transistors distinct from the first and second switching elements, wherein:

a second voltage is imparted to said second electrode by said SRAM when a first voltage is imparted to said first electrode by said first switching element;

said first voltage is imparted to said second electrode by said SRAM when said second voltage is imparted to said first electrode by said first switching element;

said first voltage is imparted to said first electrode by said SRAM when said second voltage is imparted to said second electrode by said second switching element;

a switching of said first switching element is controlled by a first signal; and a switching of said second switching element is controlled by a second signal.

4. A digital micromirror device comprising:

a micromirror;

a first electrode and a second electrode for changing the inclination of said micromirror;

a first switching element for imparting a first voltage or a second voltage to said first electrode;

a second switching element for imparting said first voltage or said second voltage to said second electrode; and a SRAM electrically connected to the first and second switching elements and including transistors distinct from the first and second switching elements, wherein the SRAM imparts said second voltage to one of said first electrode and said second electrode, when said first voltage is imparted to the other one of electrodes, and the SRAM imparts said first voltage to one of said first electrode and said second electrode, when said second voltage is imparted to the other one of said electrodes.

5. A digital micromirror device comprising:

a micromirror;

a first electrode and a second electrode for changing the inclination of said micromirror;

a first switching element for imparting a first voltage or a second voltage to said first electrode;

a second switching element for imparting said first voltage or said second voltage to said second electrode; and a SRAM electrically connected to the first and second switching elements and including transistors distinct from the first and second switching elements, wherein the SRAM imparts said second voltage to one of said first electrode and said second electrode, when said first voltage is imparted to the other one of electrodes, and the SRAM imparts said first voltage to one of said first electrode and said second electrode, when said second voltage is imparted to the other one of the electrodes;

wherein:

a switching of said first switching element is controlled by a first signal, and a switching of said second switching element is controlled by a second signal.

6. The digital micromirror device according to claim 2, wherein the SRAM comprises two p-channel transistors and two n-channel transistors.

7. The digital micromirror device according to claim 3, wherein the SRAM comprises two p-channel transistors and two n-channel transistors.

8. The digital micromirror device according to claim 4, wherein the SRAM comprises two p-channel transistors and two n-channel transistors.

9. The digital micromirror device according to claim 5, wherein the SRAM comprises two p-channel transistors and two n-channel transistors.

10. The digital micromirror device according to claim 2, wherein the SRAM comprises two p-channel transistors and two resistors.

11. The digital micromirror device according to claim 3, wherein the SRAM comprises two p-channel transistors and two resistors.

12. The digital micromirror device according to claim 4, wherein the SRAM comprises two p-channel transistors and two resistors.

13. The digital micromirror device according to claim 5, wherein the SRAM comprises two p-channel transistors and two resistors.

14. The digital micromirror device according to claim 2, wherein the SRAM comprises two n-channel transistors and two resistors.

15. The digital micromirror device according to claim 3, wherein the SRAM comprises two n-channel transistors and two resistors.

16. The digital micromirror device according to claim 4, wherein the SRAM comprises two n-channel transistors and two resistors.

17. The digital micromirror device according to claim 5, wherein the SRAM comprises two n-channel transistors and two resistors.

18. An electronic device having the digital micromirror device according to claim 2.

19. An electronic device having the digital micromirror device according to claim 3.

20. An electronic device having the digital micromirror device according to claim 4.

21. An electronic device having the digital micromirror device according to claim 5.

22. An electronic device having the digital micromirror device according to claim 6.

23. An electronic device having the digital micromirror device according to claim 7.

24. An electronic device having the digital micromirror device according to claim 8.

25. The electronic device according to claim 18, wherein the electronic device is selected from the group consisting of a projector, a printer, and a copy machine.

26. The electronic device according to claim 19, wherein the electronic device is selected from the group consisting of a projector, a printer, and a copy machine.

27. The electronic device according to claim 20, wherein the electronic device is selected from the group consisting of a projector, a printer, and a copy machine.

28. The electronic device according to claim 21, wherein the electronic device is selected from the group consisting of a projector, a printer, and a copy machine.

29. The electronic device according to claim 22, wherein the electronic device is selected from the group consisting of a projector, a printer, and a copy machine.

30. The electronic device according to claim 23, wherein the electronic device is selected from the group consisting of a projector, a printer, and a copy machine.

31. The electronic device according to claim 24, wherein the electronic device is selected from the group consisting of a projector, a printer, and a copy machine.

32. A method of driving a digital micromirror device having a plurality of pixels, each pixel including: a micromirror; a first electrode and a second electrode for changing the inclination of said micromirror; and a SRAM; said method comprising the steps of:

preparing n display periods and j non-display periods within one frame period in each of said plurality of pixels;

imparting a second voltage to said second electrode by said SRAM in each of n display periods if a first voltage of a digital signal of bits corresponding to each of n display periods is imparted to said first electrode of each of said plurality of pixels;

imparting said first voltage to said second electrode by said SRAM in each of n display periods if said second voltage of the digital signal of bits corresponding to each of n display periods is imparted to said first electrode of each of said plurality of pixels;

imparting said first voltage to said first electrode by said SRAM in each of j non-display periods if said second voltage is imparted to said second electrode of each of said plurality of pixels;

preparing any one of said n display periods again, after all of said n display periods appear;

wherein a ratio of the lengths of said n display periods is expressed as $2^0:2^1:\ldots:2^{(n-1)}$.

33. A method of driving a digital micromirror device having a plurality of pixels, each pixel including: a micromirror; a first electrode and a second electrode for changing the inclination of said micromirror; a SRAM; a first switching element; and a second switching element; said method comprising the steps of:

preparing n display periods and j non-display periods within one frame period in each of said plurality of pixels;

imparting a second voltage to said second electrode by said SRAM in each of n display periods if a first voltage of a digital signal of bits corresponding of each of n display periods is imparted to said first electrode of each of said plurality of pixels, in accordance with said first switching element turning on;

imparting said first voltage to said second electrode by said SRAM in each of n display periods if said second voltage of the digital signal of bits corresponding to each of n display periods is imparted to said first electrode of each of said plurality of pixels, in accordance with said first switching element turning on;

imparting said first voltage to said first electrode by said SRAM in each of j non-display periods if said second voltage is imparted to said second electrode of each of said plurality of pixels, in accordance with said second switching element turning on;

preparing any one of said n display periods again, after all of said n display periods appear;

wherein a ratio of the lengths of said n display periods is expressed as $2^0:2^1:\ldots:2^{(n-1)}$.

34. A method of driving a digital micromirror device having a plurality of pixels, each pixel including:

a micromirror;

a first electrode and a second electrode for changing the inclination of said micromirror; and a SRAM for imparting a second voltage to one of said first electrode and said second electrode, when a first voltage is imparted to the other one of electrodes, and imparting said first voltage to one of said first electrode and said second electrode, when said second voltage is imparted to the other one of the electrodes;

said method comprising the steps of:

preparing n first display periods and j second display periods within one frame period in each of said plurality of pixels;

imparting said first voltage or said second voltage of a digital signal of bits corresponding to each of n first display periods to said first electrode of each of said plurality of pixels in each of n first display periods;

imparting said first voltage or said second voltage of a digital signal of bits corresponding to each of j second display periods to said second electrode of each of said plurality of pixels in each of j second display periods;

preparing one of said n first display periods and one of said j second display periods again, after all of said n first display periods and j second display periods appear;

wherein a ratio of the lengths of said n first display periods and the lengths of said j second display periods is expressed as $2^0:2^1:\ldots:2^{(n-1)}$.

35. A method of driving a digital micromirror device having a plurality of pixels, each pixel including:

a micromirror;

a first electrode and a second electrode for changing the inclination of the micromirror;

a first switching element;

a second switching element; and a SRAM for imparting a second voltage to one of said first electrode and said second electrode, when said first voltage is imparted to the other one of electrodes, imparting said first voltage to one of said first electrode and said second electrode, when said second voltage is imparted to the other one of the electrodes;

said method comprising the steps of:

preparing n first display periods and j second display periods within one frame period in each of said plurality of pixels;

imparting said first voltage or said second voltage of a digital signal of bits corresponding to each of n first display periods to said first electrode of each of said plurality of pixels in each of n first display periods, in accordance with said first switching element turning on;

imparting said first voltage or said second voltage of a digital signal of bits corresponding to each of j second display periods to said second electrode of each of said plurality of pixels in each of j second display periods, in accordance with said second switching element turning on;

preparing any one of said n first display periods and any one of said j second display periods again, after all of said n first display periods and j second display periods appear; and wherein a ratio of the lengths of said n first display periods and the lengths of said j second display periods is expressed as $2^0:2^1:\ldots:2^{(n-1)}$.

36. The method of driving a digital micromirror device according to claim 32, wherein black is displayed when a second voltage is imparted to a second electrode in each of a plurality of pixels.

37. The method of driving a digital micromirror device according to claim 33, wherein black is displayed when a second voltage is imparted to a second electrode in each of a plurality of pixels.

38. The method of driving a digital micromirror device according to claim 34, wherein black is displayed when a second voltage is imparted to a second electrode in each of a plurality of pixels.

39. The method of driving a digital micromirror device according to claim 35, wherein black is displayed when a second voltage is imparted to a second electrode in each of a plurality of pixels.

40. A digital micromirror device according to claim 1, wherein said first switching element is a first transistor and said second switching element is a second transistor.

41. A digital micromirror device according to claim 2, wherein said first switching element is a first transistor and said second switching element is a second transistor.

42. A digital micromirror device according to claim 3, wherein said first switching element is a first transistor and said second switching element is a second transistor.

43. A digital micromirror device according to claim 4, wherein said first switching element is a first transistor and said second switching element is a second transistor.

44. A digital micromirror device according to claim 5, wherein said first switching element is a first transistor and said second switching element is a second transistor.

45. A digital micromirror device according to claim 40, wherein a first gate electrode of said first transistor is electrically connected to a first signal line and said second gate electrode of said second transistor is electrically connected to a second signal line.

46. A digital micromirror device according to claim 41, wherein a first gate electrode of said first transistor is electrically connected to a first signal line and said second gate electrode of said second transistor is electrically connected to a second signal line.

47. A digital micromirror device according to claim 42, wherein a first gate electrode of said first transistor is electrically connected to a first signal line and said second gate electrode of said second transistor is electrically connected to a second signal line.

48. A digital micromirror device according to claim 43, wherein a first gate electrode of said first transistor is electrically connected to a first signal line and said second gate electrode of said second transistor is electrically connected to a second signal line.

49. A digital micromirror device according to claim 44, wherein a first gate electrode of said first transistor is electrically connected to a first signal line and said second gate electrode of said second transistor is electrically connected to a second signal line.

* * * * *